United States Patent
Tsukagoshi et al.

(10) Patent No.: US 12,301,148 B2
(45) Date of Patent: May 13, 2025

(54) MOTOR CONTROL DEVICE, ELECTRO-MECHANICAL INTEGRATED UNIT, HYBRID SYSTEM, AND ELECTRIC POWER STEERING SYSTEM

(71) Applicant: HITACHI ASTEMO, LTD., Hitachinaka (JP)

(72) Inventors: Takaya Tsukagoshi, Hitachinaka (JP); Shun Taniguchi, Tokyo (JP); Takafumi Hara, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 210 days.

(21) Appl. No.: 18/249,299

(22) PCT Filed: Sep. 21, 2021

(86) PCT No.: PCT/JP2021/034639
§ 371 (c)(1),
(2) Date: Apr. 17, 2023

(87) PCT Pub. No.: WO2022/085351
PCT Pub. Date: Apr. 28, 2022

(65) Prior Publication Data
US 2023/0402953 A1  Dec. 14, 2023

(30) Foreign Application Priority Data
Oct. 21, 2020 (JP) .................. 2020-176806

(51) Int. Cl.
*H02P 27/08* (2006.01)
(52) U.S. Cl.
CPC .................... *H02P 27/08* (2013.01)

(58) Field of Classification Search
CPC .......... H02P 27/00; H02P 27/04; H02P 27/06; H02P 27/08; H02P 6/08; H02P 6/10;
(Continued)

(56) References Cited

U.S. PATENT DOCUMENTS 8,519,653 B2 * 8/2013 Takamatsu .............. H02P 27/08
318/400.26
2006/0097685 A1    5/2006 Shin et al.
(Continued)

FOREIGN PATENT DOCUMENTS

JP    2006-136138 A    5/2006
JP    2018-004246 A    1/2018
(Continued)

OTHER PUBLICATIONS

International Search Report with English Translation and Written Opinion dated Dec. 7, 2021 in corresponding International Patent Application No. PCT/JP2021/034639 (11 pages).

*Primary Examiner* — Antony M Paul
(74) *Attorney, Agent, or Firm* — Foley & Lardner LLP

(57) ABSTRACT

A motor control device is connected to a power converter that performs power conversion from DC power to AC power and controls driving of an AC motor driven using the AC power, and the motor control device includes a carrier wave generation unit that generates a carrier wave, a carrier wave frequency adjustment unit that adjusts a frequency of the carrier wave, and a gate signal generation unit that performs pulse width modulation on a voltage command according to a torque command using the carrier wave and generates a gate signal for controlling an operation of the power converter, in which a phase difference between the voltage command and the carrier wave is randomly changed.

10 Claims, 18 Drawing Sheets

(58) Field of Classification Search
CPC .... H02P 6/14; H02P 6/153; H02P 7/29; H02P 21/00; H02P 21/22; H02P 21/30; H02P 23/00; H02P 23/0027; H02P 23/07; H02P 23/28; H02P 25/022; H02P 25/03; H02P 25/062; H02P 25/064; H02P 229/50; H02P 2101/45; H02P 1/46; H02P 27/085; H02P 29/50; H02P 25/22; H02P 2207/05; H02M 7/5395; H02M 7/53871; H02M 1/12; H02M 1/0025; H02M 1/14; B60L 2240/527; B60L 2240/423; B60L 2220/14; B62D 5/046

See application file for complete search history.

(56) References Cited

U.S. PATENT DOCUMENTS

| | | |
|---|---|---|
| 2007/0247091 A1 | 10/2007 | Maiocchi |
| 2012/0056569 A1 | 3/2012 | Takamatsu et al. |
| 2017/0025929 A1 | 1/2017 | D'Angelo et al. |
| 2017/0331395 A1 | 11/2017 | Kanazawa et al. |
| 2020/0119678 A1 | 4/2020 | Hoshino et al. |

FOREIGN PATENT DOCUMENTS

| | | |
|---|---|---|
| WO | WO-2010/137162 A1 | 12/2010 |
| WO | WO-2016/098410 A1 | 6/2016 |
| WO | WO-2018/139295 A1 | 8/2018 |

\* cited by examiner

MOTOR CONTROL DEVICE, ELECTRO-MECHANICAL INTEGRATED UNIT, HYBRID SYSTEM, AND ELECTRIC POWER STEERING SYSTEM

TECHNICAL FIELD

The present invention relates to a motor control device, an electro-mechanical integrated unit, a hybrid system, and an electric power steering system.

BACKGROUND ART

A permanent magnet synchronous motor does not require a mechanical current rectifying mechanism such as a brush or a commutator, is easy to maintain, is small and lightweight, and has high efficiency and power factor. Therefore, the permanent magnet synchronous motor is widely used for applications such as driving and power generation of electric vehicles. In general, a permanent magnet synchronous motor includes a stator including an armature coil and the like, and a rotor including a permanent magnet, an iron core, and the like. A DC voltage supplied from a DC power supply such as a battery is converted into an AC voltage by an inverter, and an AC current flows through an armature coil of a permanent magnet synchronous motor using the AC voltage, thereby generating an armature magnetic flux. The permanent magnet synchronous motor is driven by magnet torque generated by attractive force and repulsive force generated between the armature magnetic flux and the magnet magnetic flux of the permanent magnet, and reluctance torque generated to minimize magnetic resistance of the armature magnetic flux passing through the rotor.

In the permanent magnet synchronous motor, electromagnetic forces due to an armature magnetic flux and a magnet magnetic flux are generated in a rotation direction (circumferential direction) of the motor and a direction (radial direction) perpendicular to a rotation axis of the motor. The above torque is obtained by integrating the electromagnetic force in the circumferential direction, and includes torque fluctuation (torque pulsation) caused by a structure of a magnetic circuit of the motor. Meanwhile, the electromagnetic force generated in the radial direction of the motor acts as an excitation force (electromagnetic excitation force) that deforms and vibrates the stator and the case of the motor.

At the time of low rotation of the motor, since there are few other factors of vibration and noise, vibration and noise caused by torque pulsation become apparent. In particular, in an environmentally friendly vehicle using a permanent magnet synchronous motor such as an electric vehicle or a hybrid vehicle, vehicle body resonance may occur due to a two-inertia system of a rotor and a tire of the motor at low rotation, and vibration and noise may become remarkable. Meanwhile, in the rotating speed region of the motor except for the low rotation speed, the electromagnetic force (electromagnetic excitation force) in the radial direction is about 5 to 10 times as large as the electromagnetic force (torque pulsation) in the circumferential direction. Therefore, vibration and noise due to the electromagnetic excitation force become dominant.

In addition, the AC current flowing through the motor includes a fundamental harmonic current component such as a sine wave that is used for drive control of the motor and whose frequency is converted according to the rotating speed of the motor, and a harmonic current component due to switching operation of the inverter. The frequency of the harmonic current is determined by the frequency of the fundamental harmonic current and the frequency of the carrier wave used for PWM modulation. Therefore, depending on the rotating speed of the motor, the electromagnetic excitation force or the torque pulsation generated in the motor by the fundamental harmonic current and the electromagnetic excitation force or the torque pulsation generated in the motor by the harmonic current overlap each other, and large vibration or noise may be generated.

As a related technique of the present invention, a technique described in PTL 1 is known. PTL 1 discloses a method for controlling a second phase including a fundamental harmonic current according to a rotating speed of a permanent magnet motor and a harmonic current due to a switching operation such that a first phase that is a phase of an excitation force periodically generated in the motor by the fundamental harmonic current and the second phase that is a phase of an excitation force periodically generated in the motor by the harmonic current do not overlap each other at a predetermined motor rotating speed.

CITATION LIST

Patent Literature

PTL 1: WO 2018/139295 A

SUMMARY OF INVENTION

Technical Problem

As described above, at the time of low rotation of the motor, since there are few other factors of vibration and noise, vibration and noise caused by torque pulsation become apparent. Meanwhile, vibration and noise due to an electromagnetic excitation force are dominant in a rotating speed region of the motor except for the low rotation speed. As described above, in an environmentally friendly vehicle using a permanent magnet synchronous motor such as an electric vehicle or a hybrid vehicle, vibration and noise are a problem in a wide range of rotating speeds. However, the method disclosed in PTL 1 cannot effectively improve such a point in a wide range of rotating speeds.

The present invention has been made in view of the above problems, and an object thereof is to effectively suppress vibration and noise generated in a permanent magnet synchronous motor.

Solution to Problem

According to an aspect of the present invention, there is provided a motor control device that is connected to a power converter that performs power conversion from DC power to AC power and controls driving of an AC motor driven using the AC power, the motor control device including: a carrier wave generation unit that generates a carrier wave; a carrier wave frequency adjustment unit that adjusts a frequency of the carrier wave; and a gate signal generation unit that performs pulse width modulation on a voltage command according to a torque command using the carrier wave and generates a gate signal for controlling an operation of the power converter, in which a phase difference between the voltage command and the carrier wave is randomly changed.

According to another aspect of the present invention, there is provided an electro-mechanical integrated unit including: the motor control device; the power converter connected to the motor control device; the AC motor driven by the power converter; and a gear that transmits a rotational driving force of the AC motor, in which the AC motor, the power converter, and the gear are integrated.

According to still another aspect of the present invention, there is provided a hybrid system including: the motor control device; the power converter connected to the motor control device; the AC motor driven by the power converter; and an engine system connected to the AC motor.

According to still another aspect of the present invention, there is provided an electric power steering system including: the motor control device; the power converter connected to the motor control device; and the AC motor driven by the power converter, in which a steering operation of a driver is assisted using a rotational driving force of the AC motor.

Advantageous Effects of Invention

According to the present invention, vibration and noise generated in a permanent magnet synchronous motor can be effectively suppressed.

DESCRIPTION OF EMBODIMENTS

First Embodiment

Hereinafter, a first embodiment of the present invention will be described with reference to the drawings.

Figure 1:
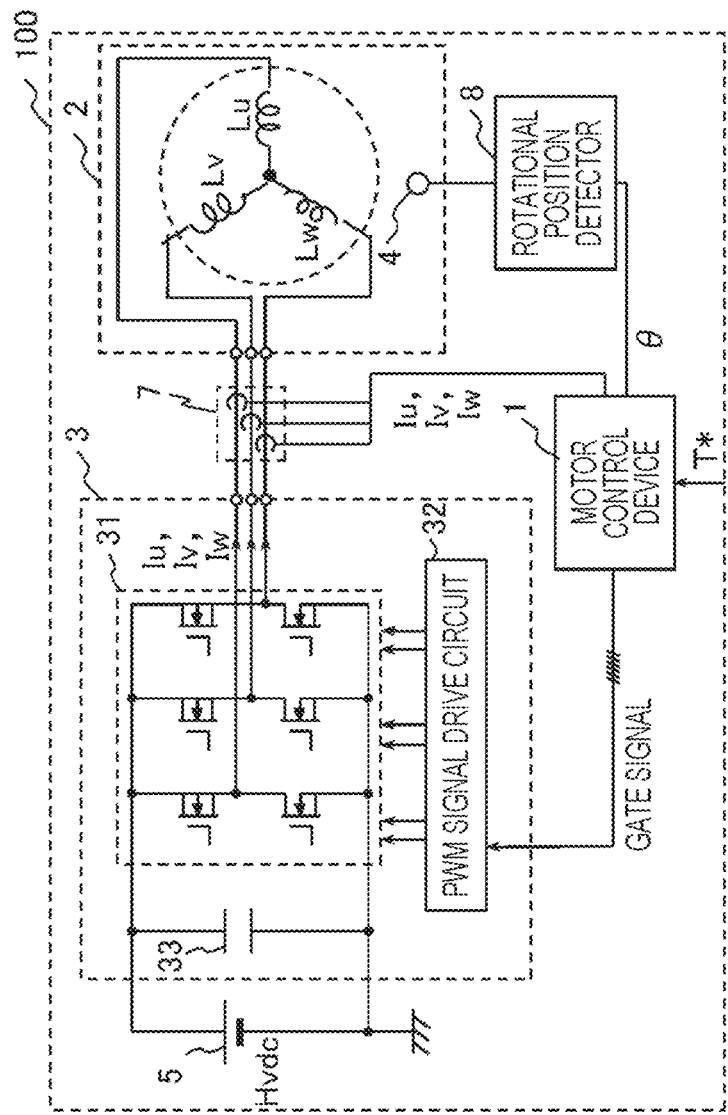
FIG. 1 is an overall configuration diagram of a motor drive system including a motor control device according to an embodiment of the present invention.

FIG. 1 is an overall configuration diagram of a motor drive system including a motor control device according to an embodiment of the present invention. In FIG. 1, a motor drive system 100 includes a motor control device 1, a motor 2, an inverter 3, a high-voltage battery 5, a current detection unit 7, and a rotational position detector 8.

A rotational position θ of the motor 2 is input from the rotational position detector 8 to the motor control device 1. In addition, Iu, Iv, and Iw representing three-phase AC currents flowing through the motor 2 are input from the current detection unit 7, and a torque command T* is input from a host control device (not illustrated). The motor control device 1 generates a gate signal for controlling the drive of the motor 2 on the basis of the input information, and outputs the gate signal to the inverter 3. Thus, the operation of the inverter 3 is controlled, and the driving of the motor 2 is controlled. Details of the motor control device 1 will be described later.

The inverter 3 includes an inverter circuit 31, a PWM signal drive circuit 32, and a smoothing capacitor 33. The PWM signal drive circuit 32 generates a PWM signal for controlling each switching element included in the inverter circuit 31 on the basis of the gate signal input from the motor control device 1, and outputs the PWM signal to the inverter circuit 31. The inverter circuit 31 includes switching elements respectively corresponding to the upper arm and the lower arm of the U phase, the V phase, and the W phase. By controlling each of these switching elements according to the PWM signal input from the PWM signal drive circuit 32, DC power supplied from the high-voltage battery 5 is converted into AC power and output to the motor 2. The smoothing capacitor 33 smooths the DC power supplied from the high-voltage battery 5 to the inverter circuit 31.

The high-voltage battery 5 is a DC voltage source of the motor drive system 100, and outputs a power supply voltage Hvdc to the inverter 3. The power supply voltage Hvdc of the high-voltage battery 5 is converted into a pulsed three-phase AC voltage having a variable voltage and a variable frequency by the inverter circuit 31 and the PWM signal drive circuit 32 of the inverter 3, and is applied to the motor 2 as a line voltage. As a result, AC power is supplied from the inverter 3 to the motor 2 on the basis of the DC power of the high-voltage battery 5. Note that the power supply voltage Hvdc of the high-voltage battery 5 varies depending on a state of charge thereof.

The motor 2 is a three-phase motor rotationally driven by the AC power supplied from the inverter 3, and includes a stator and a rotor. In the present embodiment, an example in which a permanent magnet synchronous motor is used as the motor 2 will be described, but another type of motor 2 such as an induction motor or a synchronous reluctance motor may be used. When the AC power input from the inverter 3 is applied to the three-phase coils Lu, Lv, and Lw provided in the stator, the three-phase AC currents Iu, Iv, and Iw are conducted in the motor 2, and a magnetic flux is generated in each coil. When an attractive force and a repulsive force are generated between a magnetic flux of each coil and a magnet magnetic flux of a permanent magnet disposed in the rotor, torque is generated in the rotor, and the motor 2 is rotationally driven.

A rotational position sensor 4 for detecting a rotational position θ of the rotor is attached to the motor 2. The rotational position detector 8 calculates the rotational position θ from an input signal of the rotational position sensor 4. The calculation result of the rotational position θ by the rotational position detector 8 is input to the motor control device 1, and is used in the phase control of the AC power performed by the motor control device 1 generating a pulsed gate signal in accordance with the phase of the induced voltage of the motor 2.

Here, a resolver including an iron core and a winding is more suitable as the rotational position sensor 4, but a sensor using a magnetoresistive element such as a GMR sensor or a Hall element has no problem. Any sensor can be used as the rotational position sensor 4 as long as a magnetic pole position of the rotor can be measured. Further, the rotational position detector 8 may estimate the rotational position θ by using the three-phase AC currents Iu, Iv, and Iw flowing through the motor 2 and the three-phase AC voltages Vu, Vv, and Vw applied from the inverter 3 to the motor 2 without using the input signal from the rotational position sensor 4.

A current detection unit 7 is disposed in a current path between the inverter 3 and the motor 2. The current detection unit 7 detects three-phase AC currents Iu, Iv, and Iw (U-phase AC current Iu, V-phase AC current Iv, and W-phase AC current Iw) that energize the motor 2. The current detection unit 7 is configured using, for example, a Hall current sensor or the like. Detection results of the three-phase AC currents Iu, Iv, and Iw by the current detection unit 7 are input to the motor control device 1, and are used for generation of a gate signal performed by the motor control device 1. Although FIG. 1 illustrates an example in which the current detection unit 7 includes three current detectors, two current detectors may be provided, and the AC current of the remaining one phase may be calculated from the fact that the sum of the three-phase AC currents Iu, Iv, and Iw is zero. The pulsed DC current flowing from the high-voltage battery 5 into the inverter 3 may be detected by a shunt resistor or the like inserted between the smoothing capacitor 33 and the inverter 3, and the three-phase AC currents Iu, Iv, and Iw may be obtained based on the DC current and the three-phase AC voltages Vu, Vv, and Vw applied from the inverter 3 to the motor 2.

Figure 2:
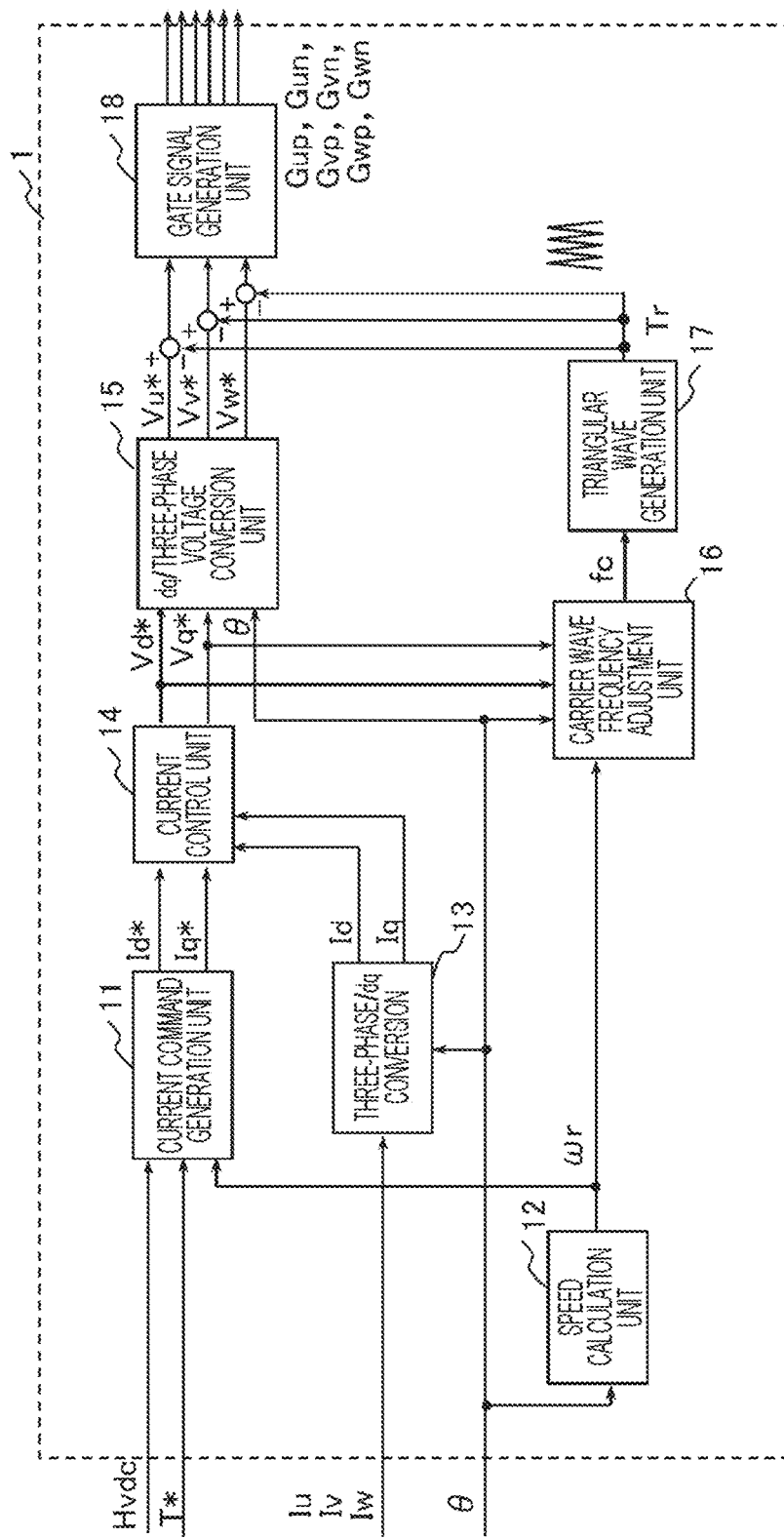
FIG. 2 is a block diagram illustrating a functional configuration of a motor control device according to the first embodiment of the present invention.

Next, details of the motor control device 1 will be described. FIG. 2 is a block diagram illustrating a functional configuration of the motor control device 1 according to the first embodiment of the present invention.

As illustrated in FIG. 2, the motor control device 1 includes functional blocks of a current command generation unit 11, a speed calculation unit 12, a three-phase/dq conversion unit 13, a current control unit 14, a dq/three-phase voltage conversion unit 15, a carrier wave frequency adjustment unit 16, a triangular wave generation unit 17, and a gate signal generation unit 18. The motor control device 1 includes, for example, a microcomputer, and can implement these functional blocks by executing a predetermined program in the microcomputer. Alternatively, some or all of these functional blocks may be realized using a hardware circuit such as a logic IC or an FPGA.

The current command generation unit 11 calculates a d-axis current command Id* and a q-axis current command Iq* based on the input torque command T* and the power supply voltage Hvdc. Here, for example, the d-axis current command Id* and the q-axis current command Iq* according to the torque command T* are obtained using a preset current command map, a mathematical expression representing a relationship between the d-axis current Id, the q-axis current Iq, and the motor torque, or the like.

The speed calculation unit 12 calculates a motor rotational speed ωr representing the rotational speed (rotating speed) of the motor 2 from the temporal change of the rotational position θ. The motor rotational speed ωr may be a value represented by either an angular speed (rad/s) or a rotating speed (rpm). In addition, these values may be mutually converted and used.

The three-phase/dq conversion unit 13 performs dq conversion based on the rotational position θ obtained by the rotational position detector 8 on the three-phase AC currents Iu, Iv, and Iw detected by the current detection unit 7, and calculates a d-axis current value Id and a q-axis current value Iq.

The current control unit 14 calculates a d-axis voltage command Vd* and a q-axis voltage command Vq* according to the torque command T* based on deviations between the d-axis current command Id* and the q-axis current command Iq* output from the current command generation unit 11 and the d-axis current value Id and the q-axis current value Iq output from the three-phase/dq conversion unit 13 so that these values match with each other. Here, for example, by a control method such as PI control, the d-axis voltage command Vd* according to the deviation between the d-axis current command Id* and the d-axis current value Id and the q-axis voltage command Vq* according to the deviation between the q-axis current command Iq* and the q-axis current value Iq are obtained.

The dq/three-phase voltage conversion unit 15 performs three-phase conversion based on the rotational position θ obtained by the rotational position detector 8 on the d-axis voltage command Vd* and the q-axis voltage command Vq* calculated by the current control unit 14, and calculates three-phase voltage commands Vu*, Vv*, and Vw* (U-phase voltage command value Vu*, V-phase voltage command value Vv*, and W-phase voltage command value Vw*). As a result, the three-phase voltage commands Vu*, Vv*, and Vw* according to the torque command T* are generated.

The carrier wave frequency adjustment unit 16 calculates a carrier wave frequency fc representing the frequency of the carrier wave used to generate the gate signal based on the d-axis voltage command Vd* and the q-axis voltage command Vq* generated by current command generation unit 11, the rotational position θ obtained by the rotational position detector 8, and the rotational speed ωr obtained by the speed calculation unit 12. Note that details of a method of calculating the carrier wave frequency fc by the carrier wave frequency adjustment unit 16 will be described later.

The triangular wave generation unit 17 generates a triangular wave signal (carrier wave signal) Tr for each of the three-phase voltage commands Vu*, Vv*, Vw* based on the carrier wave frequency fc calculated by the carrier wave frequency adjustment unit 16.

The gate signal generation unit 18 performs pulse width modulation on each of the three-phase voltage commands Vu*, Vv*, and Vw* output from the dq/three-phase voltage conversion unit 15 using the triangular wave signal Tr output from the triangular wave generation unit 17, and generates a gate signal for controlling the operation of the inverter 3. Specifically, on the basis of a comparison result between the three-phase voltage commands Vu*, Vv*, and Vw* output from the dq/three-phase voltage conversion unit 15 and the triangular wave signal Tr output from the triangular wave generation unit 17, a pulsed voltage is generated for each of the U phase, the V phase, and the W phase. Then, a pulsed gate signal for the switching element of each phase of the inverter 3 is generated based on the generated pulsed voltage. At this time, gate signals Gup, Gvp, and Gwp of upper arms of the respective phases are logically inverted to generate gate signals Gun, Gvn, and Gwn of lower arms. The gate signal generated by the gate signal generation unit 18 is output from the motor control device 1 to the PWM signal drive circuit 32 of the inverter 3, and is converted into a PWM signal by the PWM signal drive circuit 32. As a result, each switching element of the inverter circuit 31 is controlled to be turned on/off, and the output voltage of the inverter 3 is adjusted.

Next, details of the carrier wave frequency adjustment unit 16, which is a feature of the present embodiment, will be described.

Figure 3:
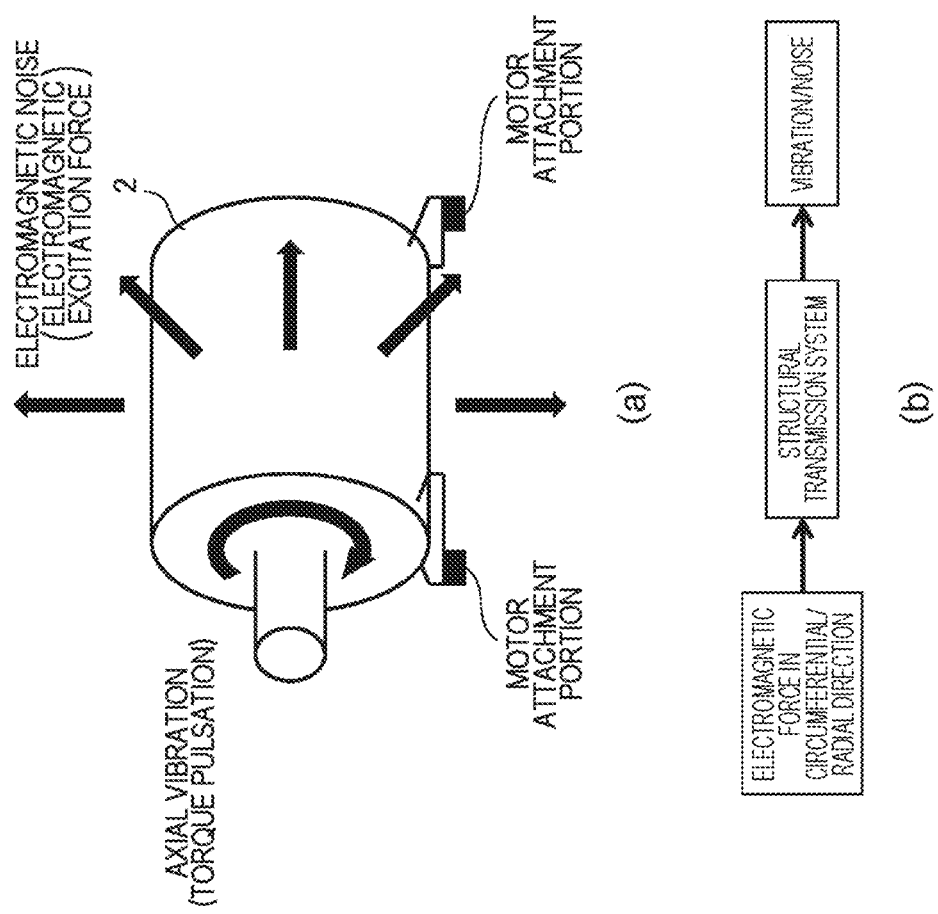
FIG. 3 is a diagram for explaining generation of vibration and noise and a transmission path thereof when the motor is driven.

First, before describing the carrier wave frequency adjustment unit 16, problems of conventional motor control will be described. FIG. 3 is a diagram for explaining generation of vibration and noise and a transmission path thereof when the motor 2 is driven.

As illustrated in FIG. 3(a), the motor 2 is installed in a structure such as a vehicle body by a motor attachment portion. When the motor 2 is driven, axial vibration (torque pulsation) occurs in a circumferential direction (around shaft) with respect to a shaft due to a change in a meshing force of a reduction gear connected to the shaft which is an output shaft, torsion of the shaft, or the like. In the circumferential direction and the radial direction of the motor 2, vibration which becomes electromagnetic noise is generated by an excitation force (electromagnetic excitation force) corresponding to each electromagnetic force. The magnitude of these vibrations varies depending on a natural mode and a natural frequency of a structural system including the motor 2, and varies depending on an operating point of the motor 2.

As described above, vibration and noise during driving of the motor 2 may be caused by a plurality of factors. In the present invention, the vibration and noise due to the electromagnetic force in the circumferential direction and the radial direction of the motor 2 are focused on and suppressed.

As illustrated in FIG. 3(b), vibration and noise generated by electromagnetic forces in the circumferential direction and the radial direction when the motor 2 is driven are input to the vehicle side via a structural transmission system such as a motor attachment portion, and generate vibration and noise.

The inverter 3 generates a PWM signal on the basis of the gate signal input from the motor control device 1, and causes each switching element of the inverter circuit 31 to perform a switching operation according to the PWM signal, thereby generating an AC voltage at an arbitrary frequency and applying the AC voltage to the motor 2. This AC voltage causes an AC current to flow in the motor 2, thereby generating electromagnetic forces in the circumferential direction and the radial direction.

Here, the frequency (switching frequency) of the switching operation of each switching element included in the inverter circuit 31 has an upper limit value due to constraints such as switching loss. Therefore, when the frequency of the AC voltage increases and approaches the switching frequency, the number of switching pulses per sine wave of the AC voltage is limited according to the upper limit value of the switching frequency. Meanwhile, in recent years, since the motor 2 is driven at a radio frequency in accordance with an increasing demand for miniaturization of the motor 2, the AC voltage applied to the motor 2 tends to have a radio frequency. Therefore, in the motor control device 1 of the present embodiment, synchronous PWM control in which the phases of the triangular wave signal (carrier wave signal) Tr and the three-phase voltage commands Vu*, Vv*, and Vw* are constant is adopted, and the gate signal for each switching element of the inverter 3 is generated.

When the switching frequency is fc and a fundamental frequency of the AC voltage applied to the motor 2, that is, the frequencies of the three-phase voltage commands Vu*, Vv*, and Vw* which are sine waves are f1, a ratio fc/f1 thereof represents the number of switching pulses per sine wave of the AC voltage. In the synchronous PWM control, it is known that a time harmonic caused by the number of switching pulses fc/f1 is generated in the AC voltage. For example, when a case of fc/f1=9 is described as a representative example, in this case, time harmonic voltages such as a time 5th order (fc−4f1), a time 7th order (fc−2f1), a time 11th order (fc+2f1), a time 13th order (fc+4f1), a time 17th order (2fc−f1), and a time 19th order (2fc+f1) are generated on the basis of the phase voltage. On the basis of the dq-axis voltage obtained by performing rotational coordinate conversion on these, time harmonic voltages such as a time 6th order (fc−3f1), a time 12th order (fc+3f1), and a time 18 order (2fc) are generated. When these time harmonic voltages are applied to the motor 2, harmonics corresponding to each order component of the time harmonic voltage are superimposed in the AC current flowing through the motor 2. Such a harmonic current causes torque pulsation and pulsation of an excitation force in the motor 2, and large vibration and noise may be generated. That is, due to the synchronous PWM control performed by the inverter 3, in the motor 2, torque pulsations such as a time 6th order (fc−3f1), a time 12th order (fc+3f1), and a time 18th order (2fc) occur.

Figure 4:
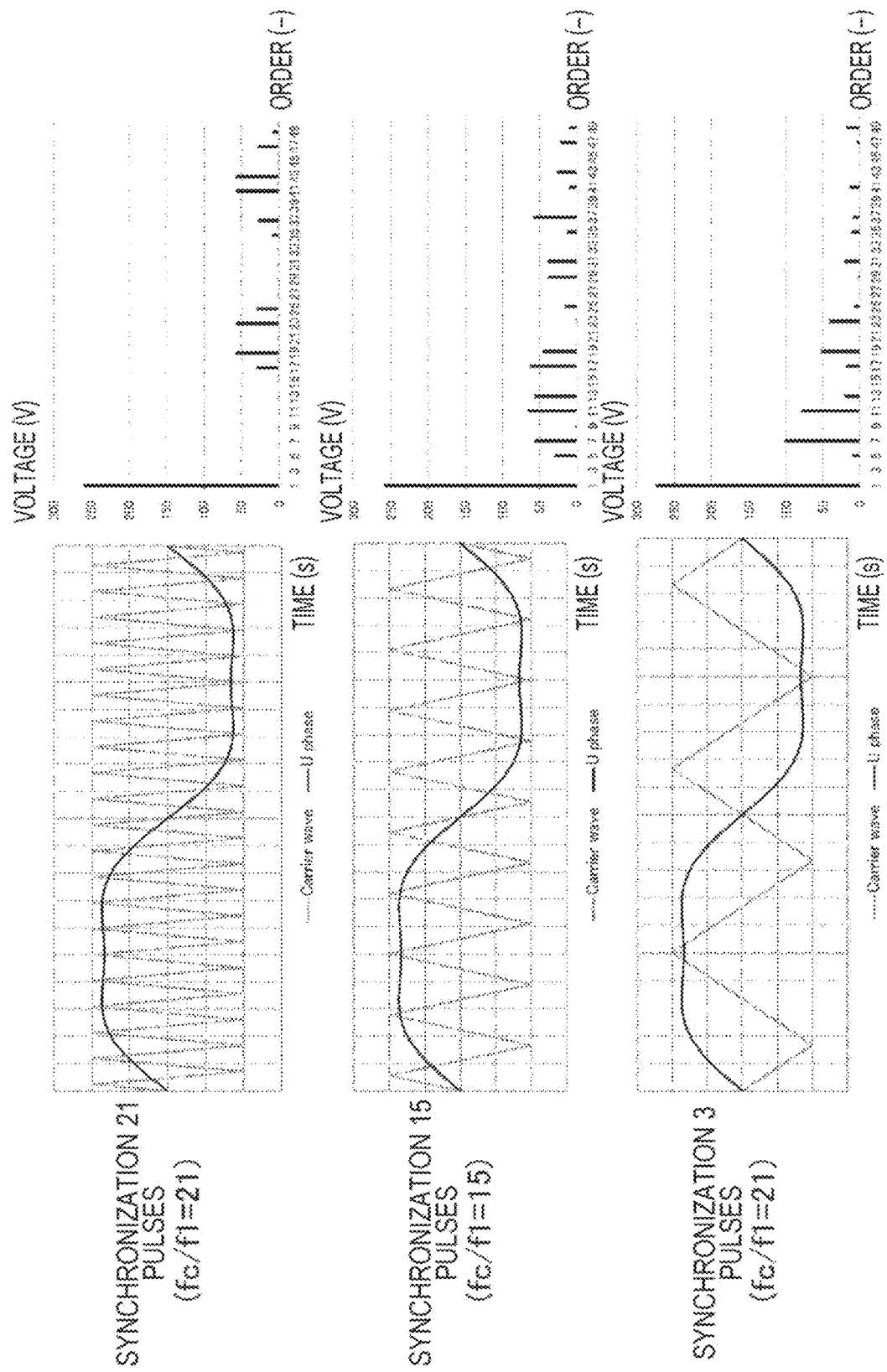
FIG. 4 is a diagram for explaining a relationship between the number of switching pulses per sine wave and a time harmonic voltage.

FIG. 4 is a diagram illustrating a relationship between the number of switching pulses per sine wave and a time harmonic voltage. FIG. 4 illustrates a relationship between the voltage command Vu* and the carrier wave signal Tr and a frequency analysis result of the generated AC voltage for each of synchronization 21 pulses (fc/f1=21), synchronization 9 pulses (fc/f1=9), and synchronization 3 pulses (fc/f1=3) in order from the top. From FIG. 4, it can be seen that when the number of switching pulses per sine wave decreases, the time harmonic component included in the AC voltage increases particularly on a low order side.

The torque pulsation and the excitation force pulsation of the motor 2 caused by the time harmonic of the AC voltage as described above have not been dealt with much in the related art due to the restriction of the number of switching pulses. Therefore, in the conventional motor control, there is a problem that vibration and noise proportional to the motor rotating speed are generated during motor driving by the synchronous PWM control.

Therefore, in the present invention, attention is paid to the following points, peaks of the components of each order of the harmonic current generated in the motor 2 are suppressed, and vibration and noise during motor driving by the synchronous PWM control are reduced.

Figure 5:
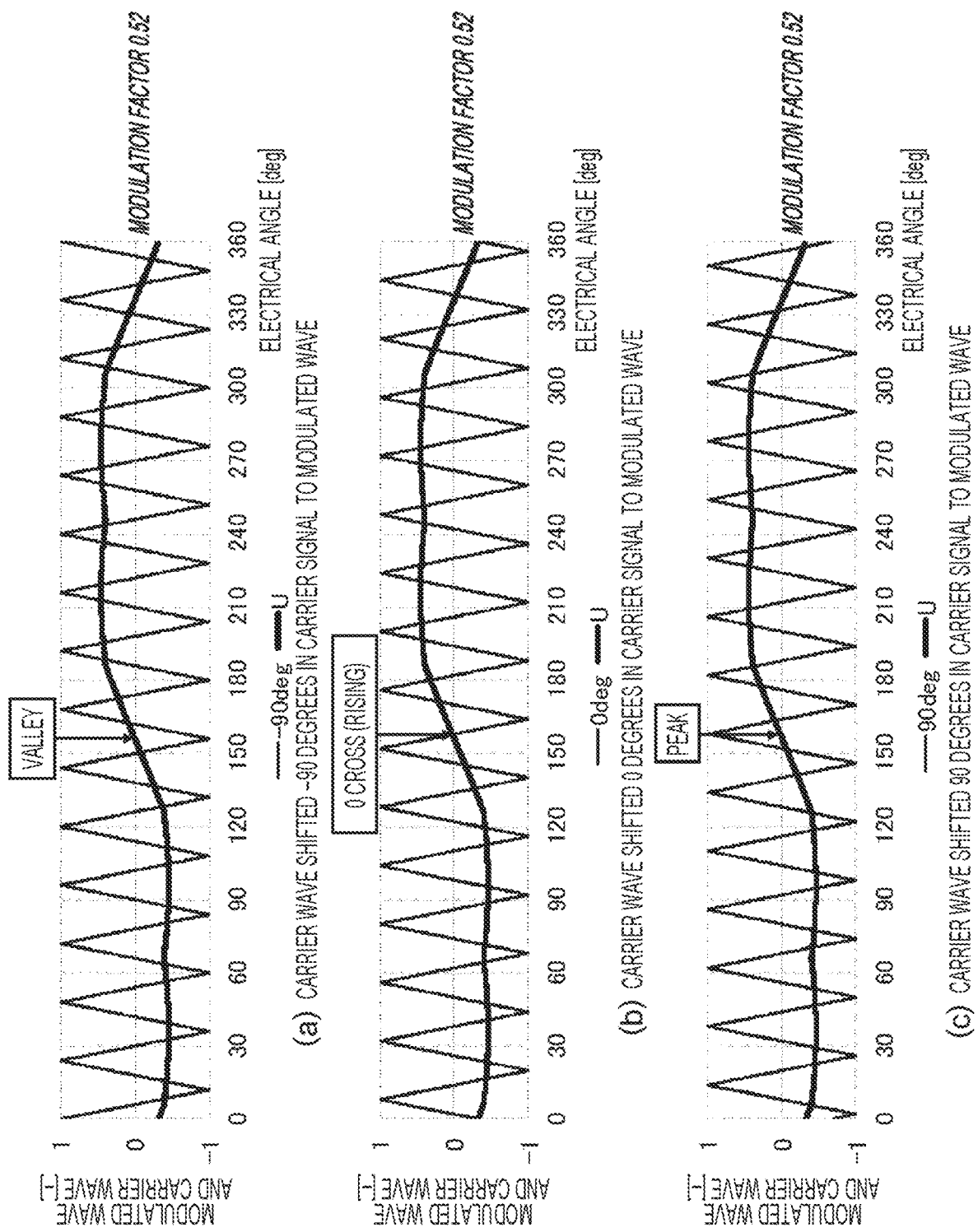
FIG. 5 is a diagram illustrating a relationship between voltage waveforms in a case where a phase difference between a modulated wave and a carrier wave is changed.

First, a basic idea of a harmonic current peak suppression method in the present embodiment will be described below with reference to FIGS. 5 and 6. FIG. 5 is a diagram illustrating a relationship between voltage waveforms when a phase difference (hereinafter, referred to as "modulated wave/carrier wave phase difference") between a U-phase voltage command Vu* as a modulated wave and a triangular wave signal Tr as a carrier wave is changed. FIG. 5(a) illustrates the voltage waveforms of the carrier wave and the modulated wave when the modulated wave/carrier wave phase difference is −90 deg, FIG. 5(b) illustrates the voltage waveforms of the carrier wave and the modulated wave when the modulated wave/carrier wave phase difference is 0 deg, and FIG. 5(c) illustrates the voltage waveforms of the carrier wave and the modulated wave when the modulated wave/carrier wave phase difference is 90 deg. In the case of FIG. 5(a), a triangular wave which is a carrier wave becomes a valley at the time of zero cross rising of the modulated wave, in the case of FIG. 5(b), the triangular wave becomes a zero cross falling at the time of zero cross rising of the modulated wave, and in the case of FIG. 5(c), the triangular wave becomes a peak at the time of zero cross rising of the modulated wave. As described above, by changing the modulated wave/carrier wave phase difference, it is possible to freely change the phase of the harmonic component other than the fundamental wave component while keeping the amplitude of the U-phase AC voltage Vu obtained by the PWM control constant as described below.

In FIGS. 5(a) to 5(c), for convenience of description, the frequency ratio between the modulated wave and the carrier wave is set to 15, but the present invention is not limited thereto. FIGS. 5(a) to 5(c) illustrate the U-phase voltage command Vu* as an example of the modulated wave, but it is also possible to freely change the phase of the harmonic component other than the fundamental wave component by setting the modulated wave/carrier wave phase difference similarly to FIG. 5 for the voltage commands of the other phases, that is, the V-phase voltage command Vv* and the W-phase voltage command Vw*.

Figure 6:
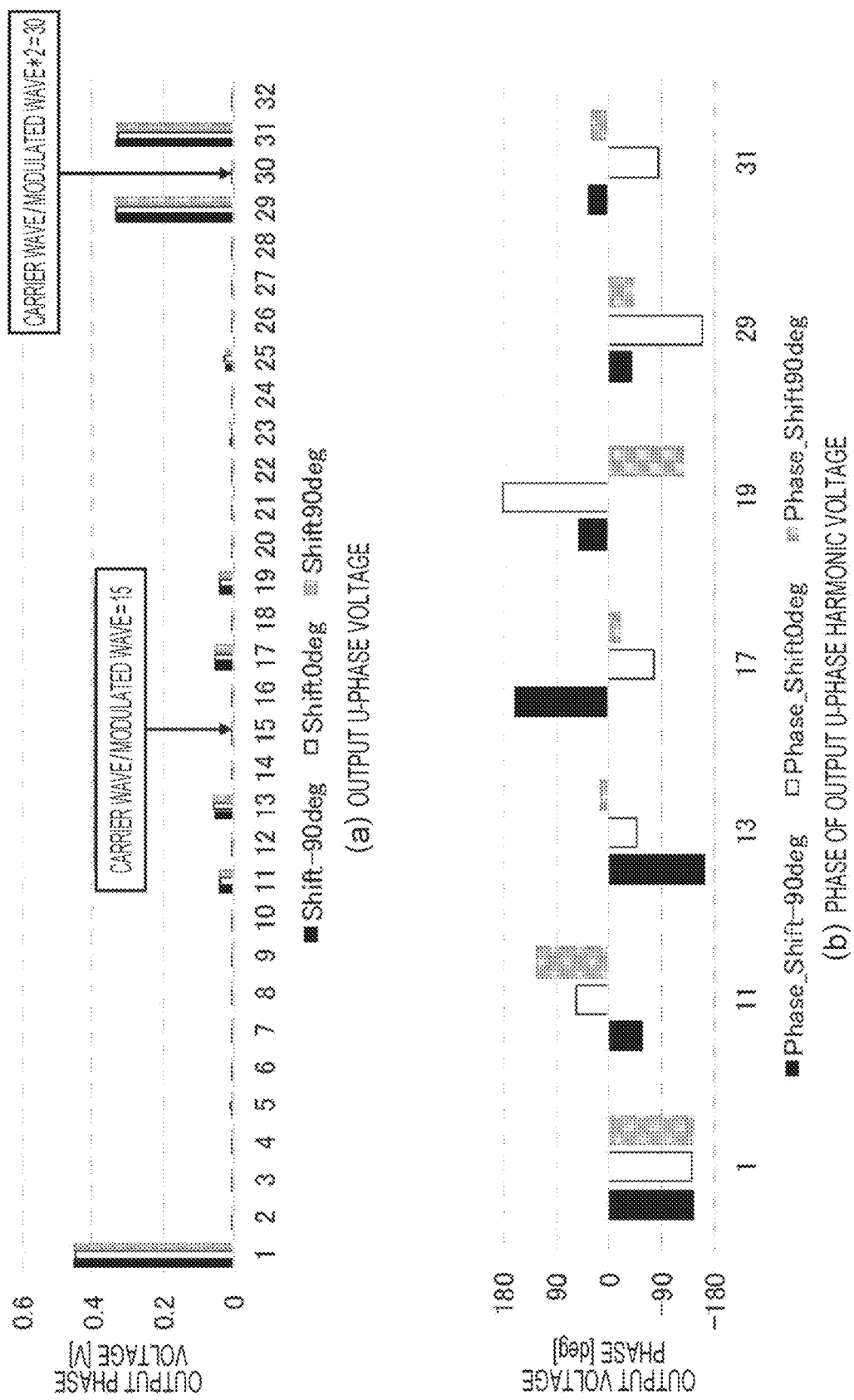
FIG. 6 is a diagram illustrating harmonic components of a U-phase AC voltage when the phase difference between the modulated wave and the carrier wave is changed.

FIG. 6 is a diagram illustrating harmonic components of the U-phase AC voltage Vu output from the inverter 3 to the motor 2 when the phase difference between the U-phase voltage command Vu* as a modulated wave and the triangular wave signal Tr as a carrier wave is changed. FIG. 6(a) illustrates the modulated wave/carrier wave phase difference illustrated in FIGS. 5(a) to 5(c), that is, the amplitude of each harmonic component of the U-phase AC voltage Vu at each phase difference of −90 deg, 0 deg, and 90 deg, and FIG. 6(b) illustrates the phase of each harmonic component of the U-phase AC voltage Vu at each phase difference. FIGS. 6(a) and 6(b) illustrate the amplitude and the phase of the fundamental wave component as the primary component of the U-phase AC voltage Vu, respectively. FIG. 6(b) illustrates phases of the 11th, 13th, 17th, 19th, 29th, and 31st harmonic components having relatively large amplitudes in FIG. 6(a) when the phase of the fundamental wave component is −135 deg.

From FIG. 6(a), it is confirmed that the amplitude of each order component including the first order (fundamental wave) does not change in the U-phase AC voltage Vu output from the inverter 3 even when the modulated wave/carrier wave phase difference is changed. That is, it can be seen that the torque output value of the motor 2 does not change even if the modulated wave/carrier wave phase difference is changed. Meanwhile, from FIG. 6(b), it can be seen that the phase of each harmonic component other than the first order (fundamental wave) component of the U-phase AC voltage Vu changes according to the modulated wave/carrier wave phase difference. That is, changing the modulated wave/carrier wave phase difference can be said to be equivalent to changing the phase of the harmonic component other than the fundamental wave component of the U-phase AC voltage Vu.

FIGS. 6(a) and 6(b) illustrate the frequency analysis results of the U-phase AC voltage Vu among the three-phase AC voltages output from the inverter 3, but the same frequency analysis results as those in FIGS. 6(a) and 6(b) are obtained for the AC voltages of the other phases, that is, the V-phase AC voltage Vv and the W-phase AC voltage Vw. Therefore, by changing the modulated wave/carrier wave phase difference, it is possible to arbitrarily change the phase of harmonic components other than the fundamental wave component of the three-phase AC voltage output from the inverter 3.

As described above, by changing the modulated wave/carrier wave phase difference, it is possible to change the phase of each harmonic component of the three-phase AC voltage output from the inverter 3 while maintaining the torque output value of the motor 2. Therefore, by randomly switching the modulated wave/carrier wave phase difference at a predetermined timing and thereby diffusing the phase of the time harmonic included in the AC voltage of the motor 2, it can be seen that the peak of the harmonic current in the motor 2 can be suppressed, and vibration and noise generated due to the harmonic current can be reduced.

In the present embodiment, based on the above idea, the carrier wave frequency fc is determined so that the carrier wave frequency adjustment unit 16 randomly switches the modulated wave/carrier wave phase difference at a predetermined timing. By sequentially controlling the frequency of the triangular wave signal Tr generated by the triangular wave generation unit 17 according to the carrier wave frequency fc, the voltage waveforms of the three-phase voltage commands Vu*, Vv*, and Vw* according to the torque command T* are adjusted such that the cycle and the phase of the triangular wave signal Tr, which is a carrier wave, have a desired relationship. Note that the desired relationship here refers to a relationship in which the phase difference between the triangular wave signal Tr and the three-phase voltage commands Vu*, Vv*, and Vw* randomly changes while maintaining synchronous PWM control for synchronizing the triangular wave signal Tr with the three-phase voltage commands Vu*, Vv*, and Vw*.

Figure 7:
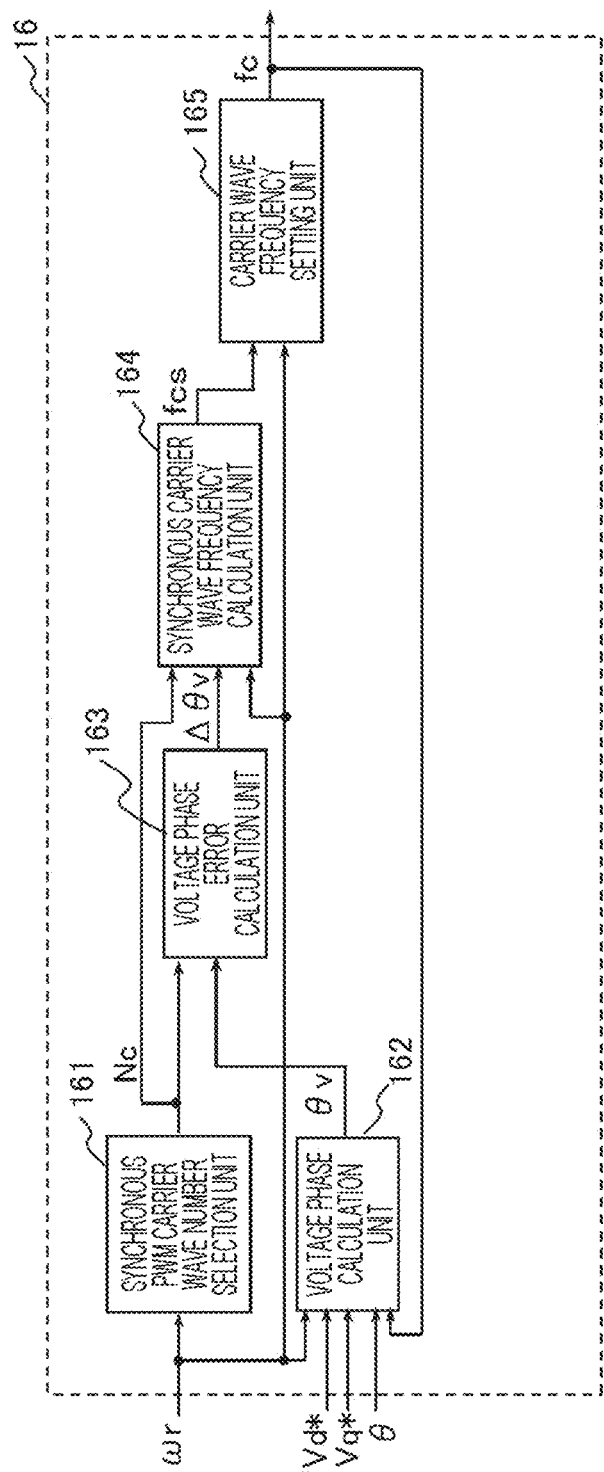
FIG. 7 is a block diagram of a carrier wave frequency adjustment unit according to the first embodiment of the present invention.

FIG. 7 is a block diagram of the carrier wave frequency adjustment unit 16 according to the first embodiment of the present invention. The carrier wave frequency adjustment unit 16 includes a synchronous PWM carrier wave number selection unit 161, a voltage phase calculation unit 162, a voltage phase error calculation unit 163, a synchronous carrier wave frequency calculation unit 164, and a carrier wave frequency setting unit 165.

The synchronous PWM carrier wave number selection unit 161 selects a synchronous PWM carrier wave number Nc representing the number of carrier waves for one cycle of the voltage waveform in the synchronous PWM control based on the rotational speed ωr. For example, the synchronous PWM carrier wave number selection unit 161 selects a number satisfying the conditional expression of Nc=3×(2× n−1) among multiples of 3 as the synchronous PWM carrier wave number Nc. In this conditional expression, n represents an arbitrary natural number, and for example, n=1 (Nc=3), n=2 (Nc=9), n=3 (Nc=15), or the like is often selected. In addition, by using a special carrier wave, it is also possible to select, as the synchronous PWM carrier wave number Nc, a number that does not satisfy the above conditional expression even when the number is a multiple of 3, for example, Nc=6 or Nc=12. The synchronous PWM carrier wave number selection unit 161 may select the synchronous PWM carrier wave number Nc based on not only the rotational speed ωr but also the torque command T*. Further, the selection criterion of the synchronous PWM carrier wave number Nc may be changed between when the rotational speed ωr increases and when the rotational speed ωr decreases, for example, by setting hysteresis.

The voltage phase calculation unit 162 calculates the voltage phase θv by the following Equations (1) to (4) on the basis of the d-axis voltage command Vd*, the q-axis voltage command Vq*, the rotational position θ, the rotational speed ωr, and the carrier wave frequency fc. The voltage phase θv represents the phases of the three-phase voltage commands Vu*, Vv*, and Vw*, which are voltage commands for the inverter 3.

$$\theta v = \theta + \varphi v + \varphi dqv + 0.5\pi \quad (1)$$

$$\varphi v = \omega r \cdot 1.5 Tc \quad (2)$$

$$Tc = 1/fc \quad (3)$$

$$\varphi dqv = a\tan(Vq/Vd) \quad (4)$$

Here, φv represents a calculation delay compensation value of a voltage phase, Tc represents a carrier wave period, and φdqv represents a voltage phase from the d-axis. The calculation delay compensation value φv is a value that compensates for occurrence of a calculation delay corresponding to 1.5 control cycles during a period from when the rotational position detector 8 acquires the rotational position θ to when the motor control device 1 outputs the gate signal to the inverter 3. In the present embodiment, 0.5 π is added in the fourth term on the right side of Equation (1). Since the voltage phase calculated in the first to third terms on the right side of Equation (1) is a cos wave, this is a calculation for performing viewpoint transformation of this into a sin wave.

The voltage phase error calculation unit 163 calculates a voltage phase error Δθv based on the synchronous PWM carrier wave number Nc selected by the synchronous PWM carrier wave number selection unit 161 and the voltage phase θv calculated by the voltage phase calculation unit 162. The voltage phase error Δθv represents a phase difference between the three-phase voltage commands Vu*, Vv*, and Vw*, which are voltage commands for the inverter 3, and the triangular wave signal Tr, which is a carrier wave used for pulse width modulation. The voltage phase error calculation unit 163 calculates the voltage phase error Δθv every predetermined calculation period, so that the carrier wave frequency adjustment unit 16 can adjust the frequency of the triangular wave signal Tr so as to randomly change the phase difference between the voltage command to the inverter 3 and the carrier wave used for pulse width modulation. Details of a method of calculating the voltage phase error Δθv by the voltage phase error calculation unit 163 will be described later.

The synchronous carrier wave frequency calculation unit 164 calculates a synchronous carrier wave frequency fcs based on the voltage phase error Δθv calculated by the voltage phase error calculation unit 163, the rotational speed ωr, and the synchronous PWM carrier wave number Nc selected by the synchronous PWM carrier wave number selection unit 161 according to the following Equation (5).

$$fcs = \omega r \cdot Nc \cdot (1 + \Delta\theta v \cdot K)/(2\pi) \quad (5)$$

The synchronous carrier wave frequency calculation unit 164 can calculate the synchronous carrier wave frequency fcs based on Equation (5), for example, by phase locked loop (PLL) control. In Equation (5), a gain K may be a constant value or may be variable depending on conditions.

The carrier wave frequency setting unit 165 selects either the synchronous carrier wave frequency fcs calculated by the synchronous carrier wave frequency calculation unit 164 or an asynchronous carrier wave frequency fcns on the basis of the rotational speed ωr, and outputs the selected frequency as the carrier wave frequency fc. The asynchronous carrier wave frequency fcns is a constant value preset in the carrier wave frequency setting unit 165. Note that a plurality of asynchronous carrier wave frequencies fcns may be prepared in advance, and one of them may be selected according to the rotational speed ωr. For example, the carrier wave frequency setting unit 165 can select and output the asynchronous carrier wave frequency fcns as the carrier wave frequency fc such that the larger the value of the rotational speed ωr, the larger the value of the asynchronous carrier wave frequency fcns.

Next, a method of calculating the voltage phase error Δθv in the voltage phase error calculation unit 163 in the carrier wave frequency adjustment unit 16 will be described in detail.

Figure 8:
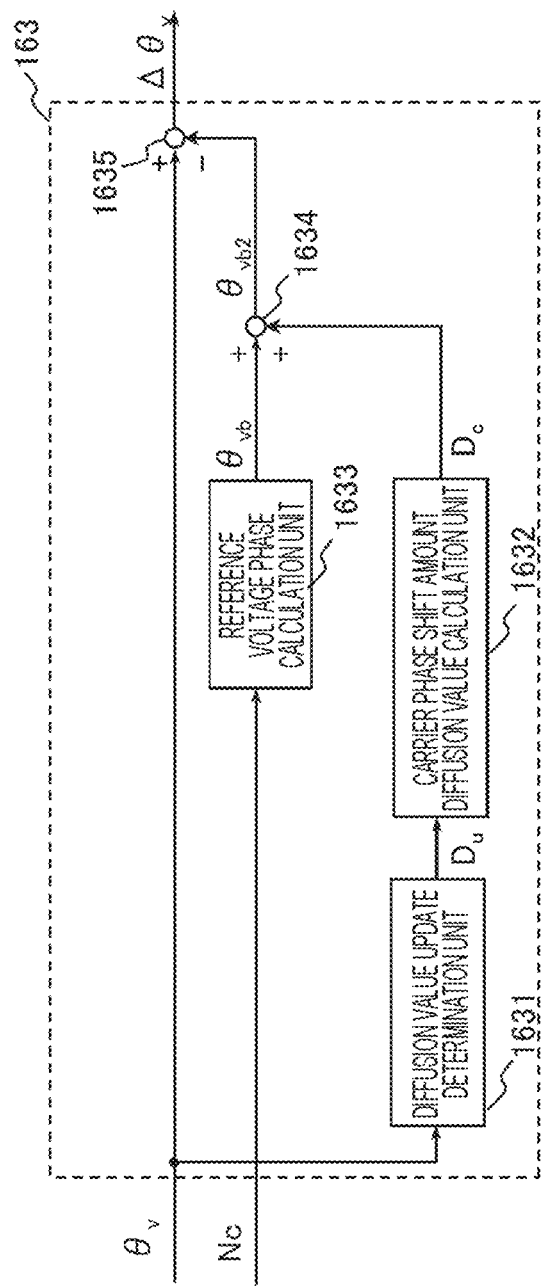
FIG. 8 is a block diagram of a voltage phase error calculation unit according to the first embodiment of the present invention.

FIG. 8 is a block diagram of the voltage phase error calculation unit 163 according to the first embodiment of the present invention. The voltage phase error calculation unit 163 includes a diffusion value update determination unit 1631, a carrier phase shift amount diffusion value calculation unit 1632, a reference voltage phase calculation unit 1633, an addition unit 1634, and a subtraction unit 1635.

Based on the voltage phase θv calculated by the voltage phase calculation unit 162, the diffusion value update determination unit 1631 determines whether to update a carrier phase shift amount diffusion value Dc (hereinafter, referred to as a "diffusion value Dc") calculated by the carrier phase shift amount diffusion value calculation unit 1632 by a method as described below. As a result, when it is determined that the diffusion value Dc is to be updated, the diffusion value Dc is updated by outputting an update signal Du to the carrier phase shift amount diffusion value calculation unit 1632.

As described above, the carrier wave frequency adjustment unit 16 performs synchronous PWM control that is control for synchronizing the triangular wave signal Tr with the three-phase voltage commands Vu*, Vv*, and Vw*. In this synchronous PWM control, the frequency of the triangular wave signal Tr is controlled such that the frequency of the triangular wave signal Tr becomes an integral multiple of the frequencies of the three-phase voltage commands Vu*, Vv*, and Vw* according to the synchronous PWM carrier wave number Nc selected by the synchronous PWM carrier wave number selection unit 161. The diffusion value update determination unit 1631 determines convergence of the synchronous PWM control based on the voltage phase θv, determines to update the diffusion value Dc and outputs the update signal Du when it is determined that the synchronous PWM control has converged.

Specifically, the diffusion value update determination unit 1631 determines that the synchronous PWM control has converged when the change amount of the voltage phase θv from the previous output time point of the update signal Du exceeds a predetermined specified phase, for example, 360 deg corresponding to one cycle of the three-phase voltage commands Vu*, Vv*, and Vw*. Alternatively, when the voltage phase error $\Delta\theta v$ calculated based on the voltage phase $\theta v$ converges within a predetermined range, for example, within a range of 1 deg or less, it may be determined that the synchronous PWM control has converged. Here, as illustrated in FIG. 8, the voltage phase error $\Delta\theta v$ is an output value of the voltage phase error calculation unit 163 including the diffusion value update determination unit 1631. Therefore, it is possible to determine whether the voltage phase error $\Delta\theta v$ has converged within a predetermined range by feeding back the previous output of the voltage phase error calculation unit 163 and inputting the output to the diffusion value update determination unit 1631. In addition to this, when it can be confirmed that the frequency of triangular wave signal Tr is adjusted such that a desired pulse shape is obtained in the gate signal generated by gate signal generation unit 18, the convergence of the synchronous PWM control can be determined by an arbitrary method.

In addition, the timing of the convergence determination of the synchronous PWM control by the diffusion value update determination unit 1631 may be changed randomly. For example, when the convergence of the synchronous PWM control is determined based on the change amount of the voltage phase $\theta v$ as described above, a specified phase to be compared with the change amount of the voltage phase $\theta v$ is randomly changed. Alternatively, when the convergence of the synchronous PWM control is determined based on the voltage phase error $\Delta\theta v$ as described above, a range in which it is determined that the voltage phase error $\Delta\theta v$ has converged is randomly changed. At that time, in order to equalize the period until the convergence of the synchronous PWM control, the value of the gain K may be changed in the above-described Equation (5) for calculating the synchronous carrier wave frequency fcs by the synchronous carrier wave frequency calculation unit 164.

The carrier phase shift amount diffusion value calculation unit 1632 calculates a diffusion value Dc for randomly changing the voltage phase error $\Delta\theta v$ within a predetermined angular range according to the update signal Du output from the diffusion value update determination unit 1631 as follows.

Figure 9:
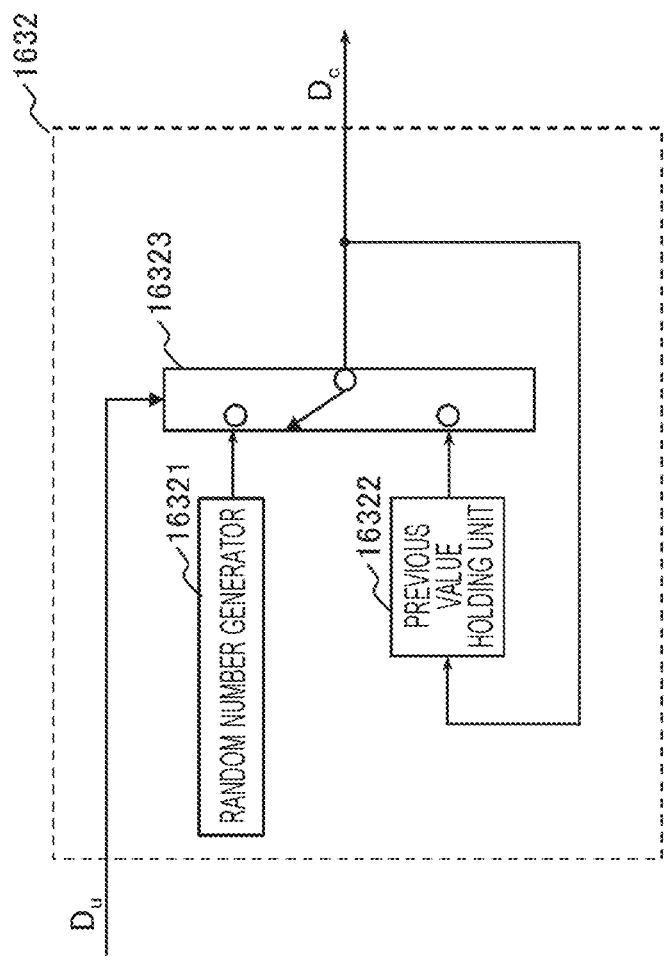
FIG. 9 is a block diagram of a carrier phase shift amount diffusion value calculation unit according to the first embodiment of the present invention.

FIG. 9 is a block diagram of the carrier phase shift amount diffusion value calculation unit 1632 according to the first embodiment of the present invention. The carrier phase shift amount diffusion value calculation unit 1632 includes a random number generator 16321, a previous value holding unit 16322, and a switching unit 16323.

The random number generator 16321 generates a random number that randomly changes within a predetermined diffusion range corresponding to the change range of the modulated wave/carrier wave phase difference described above. For example, a well-known pseudo random number generation method such as a linear congruence method is used to generate a random number uniformly distributed within a diffusion range of ±180 deg around 0. At this time, a random number weighted according to a specific distribution pattern instead of the uniform distribution may be generated, or the distribution pattern may be changed over time. In addition, instead of a random number that randomly changes, a random number that changes according to a specific change pattern such as a sinusoidal shape may be generated. Furthermore, the diffusion range of the random number is not the entire range (±180 deg) that can be set as the modulated wave/carrier wave phase difference, but may be a limited range such as ±45 deg, or the diffusion range may be changed with time. In addition to this, an arbitrary diffusion range can be set according to the range and magnitude of the peak of the harmonic current to be reduced in the AC current flowing through the motor 2. That is, the motor control device 1 can randomly change the voltage phase error $\Delta\theta v$ calculated by the voltage phase error calculation unit 163 within a predetermined range with an upper limit of the range from −180 deg to +180 deg according to the diffusion range set in the random number generator 16321. As a result, the peak of the harmonic current in the AC current flowing through the motor 2 can be reduced in an arbitrary range or size.

The previous value holding unit 16322 holds the diffusion value Dc previously output by the carrier phase shift amount diffusion value calculation unit 1632.

The switching unit 16323 selects one of the random number generator 16321 and the previous value holding unit 16322 using the update signal Du output from the diffusion value update determination unit 1631, and outputs an output value of the selected one as the diffusion value Dc. Specifically, when the update signal Du is output from the diffusion value update determination unit 1631, the diffusion value Dc is updated by outputting the random number generated by the random number generator 16321 as the diffusion value Dc. Meanwhile, when the update signal Du is not output from the diffusion value update determination unit 1631, by outputting the previous diffusion value Dc held by the previous value holding unit 16322, the previous value is maintained as it is without updating the diffusion value Dc.

The carrier phase shift amount diffusion value calculation unit 1632 calculates the diffusion value Dc as described above. As a result, in the voltage phase error calculation unit 163, when the diffusion value update determination unit 1631 determines not to update the diffusion value Dc, the previous calculation result of the diffusion value Dc by the carrier phase shift amount diffusion value calculation unit 1632 can be held. When the diffusion value update determination unit 1631 determines to update the diffusion value Dc, the diffusion value Dc can be updated using the calculation result of the current diffusion value Dc by the carrier phase shift amount diffusion value calculation unit 1632.

Figure 10:
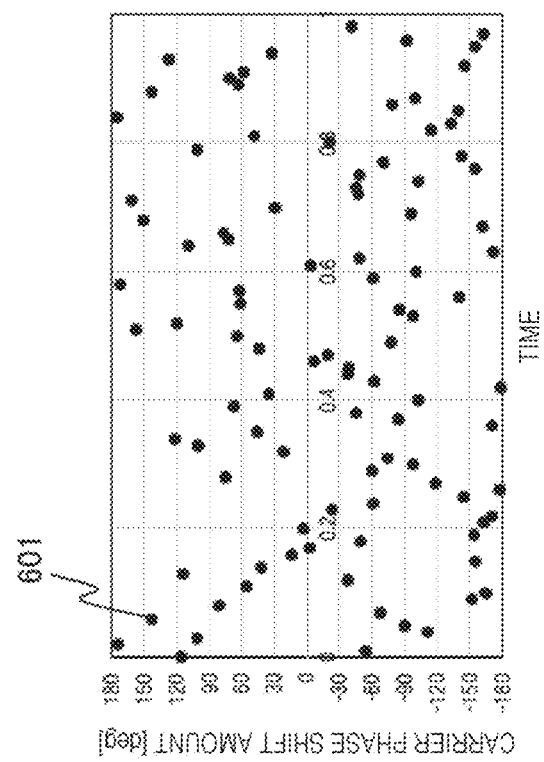
FIG. 10 is a diagram illustrating an example of a calculation result of a diffusion value by the carrier phase shift amount diffusion value calculation unit.

FIG. 10 is a diagram illustrating an example of the calculation result of the diffusion value Dc by the carrier phase shift amount diffusion value calculation unit 1632. FIG. 10 illustrates an example in which the diffusion range of the random number generated by the random number generator 16321, that is, the diffusion range of the diffusion value Dc is set to ±180 deg, and the diffusion value Dc uniformly distributed within the diffusion range is calculated. In FIG. 10, each point exemplified by a reference numeral 601 represents a diffusion value Dc calculated every predetermined time.

Returning to the description of FIG. 8, the reference voltage phase calculation unit 1633 calculates a reference voltage phase $\theta vb$ for determining the phase of the carrier wave in the synchronous PWM control based on the synchronous PWM carrier wave number Nc selected by the synchronous PWM carrier wave number selection unit 161.

Figure 11:
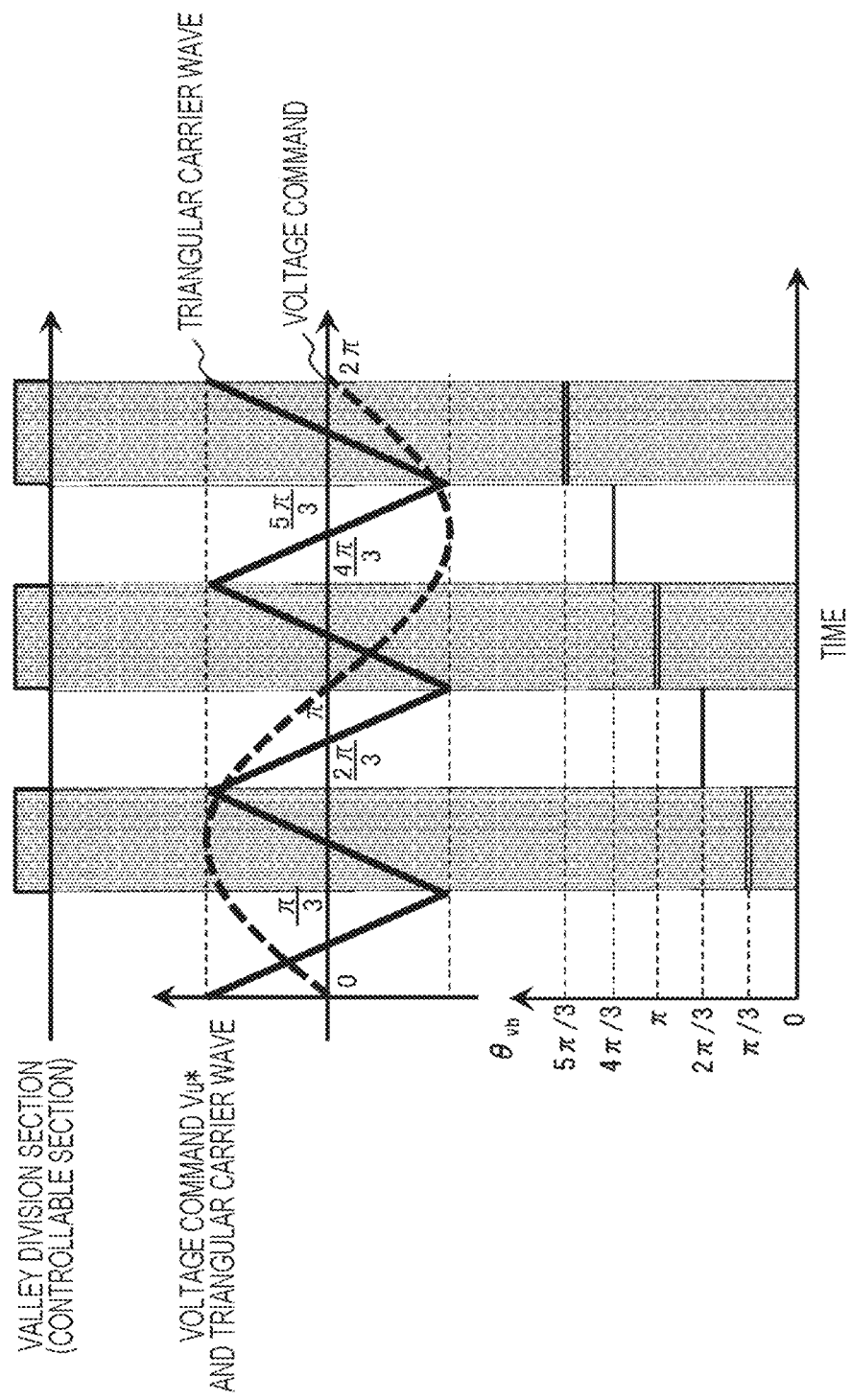
FIG. 11 is a conceptual diagram of reference voltage phase calculation of the present invention.

FIG. 11 is a conceptual diagram of the reference voltage phase calculation performed by the reference voltage phase calculation unit 1633. For example, as illustrated in FIG. 11, the reference voltage phase calculation unit 1633 calculates a reference voltage phase $\theta vb$ that changes stepwise between 0 and $2\pi$ with the number of steps corresponding to the synchronous PWM carrier wave number Nc. Although FIG. 11 illustrates an example in which the synchronous PWM carrier wave number Nc is 3 for easy understanding of the description, actually, the synchronous PWM carrier wave number Nc is preferably Nc=3, 9, or 15 as described above. Alternatively, Nc may be 6 or 12.

In the present embodiment, in order to reduce a processing load, for example, as illustrated in FIG. 11, the carrier wave frequency adjustment unit 16 can adjust the frequency of the carrier wave only in a valley division section that is a section in which a triangular carrier wave rises from a minimum value (valley) to a maximum value (peak). In this case, the synchronous carrier wave frequency calculation unit 164 performs the synchronous PWM control by sequentially calculating the synchronous carrier wave frequency fcs from the voltage phase error Δθv in the valley division section of the carrier wave. The reference voltage phase calculation unit 1633 calculates the reference voltage phase θvb used for the calculation of the voltage phase error Δθv as a discrete value that changes at π/3 intervals as illustrated in FIG. 11. The interval between the reference voltage phases θvb changes according to the synchronous PWM carrier wave number Nc. As the synchronous PWM carrier wave number Nc increases, the interval between the reference voltage phases θvb decreases.

Specifically, the reference voltage phase calculation unit 1633 calculates the reference voltage phase θvb based on the voltage phase θv and the synchronous PWM carrier wave number Nc according to the following Equations (6) to (7).

$$\theta vb = \text{int}(\theta v/\theta s) \cdot \theta s + 0.5 \theta s \quad (6)$$

$$\theta s = 2\pi/Nc \quad (7)$$

Here, θs represents a change width of the voltage phase θv per carrier wave, and int represents a rounding down operation after the decimal point.

Note that, in the present embodiment, the reference voltage phase calculation unit 1633 calculates the reference voltage phase θvb according to Equations (6) and (7) so that the reference voltage phase θvb becomes 0 rad in a peak division section, which is a section in which the triangular carrier wave falls from the maximum value (peak) to the minimum value (valley) However, a period during which the reference voltage phase θvb becomes 0 rad is not limited to the peak division section. When the reference voltage phase θvb changing stepwise with the number of steps corresponding to the synchronous PWM carrier wave number Nc between 0 and 2π can be calculated using the voltage phase θv, the reference voltage phase calculation unit 1633 may calculate the reference voltage phase θvb by a calculation method other than Equations (6) and (7).

The addition unit 1634 calculates a corrected reference voltage phase θvb2 by adding the diffusion value Dc calculated by the carrier phase shift amount diffusion value calculation unit 1632 to the reference voltage phase θvb calculated by the reference voltage phase calculation unit 1633. As a result, the corrected reference voltage phase θvb2 with respect to the voltage phase error Δθv can be calculated such that the phase of each harmonic component of the three-phase voltage commands Vu*, Vv*, and Vw* is diffused by randomly switching the modulated wave/carrier wave phase difference at a predetermined timing.

The subtraction unit 1635 subtracts the corrected reference voltage phase θvb2 from the voltage phase θv to calculate a voltage phase error Δθv.

Figure 12:
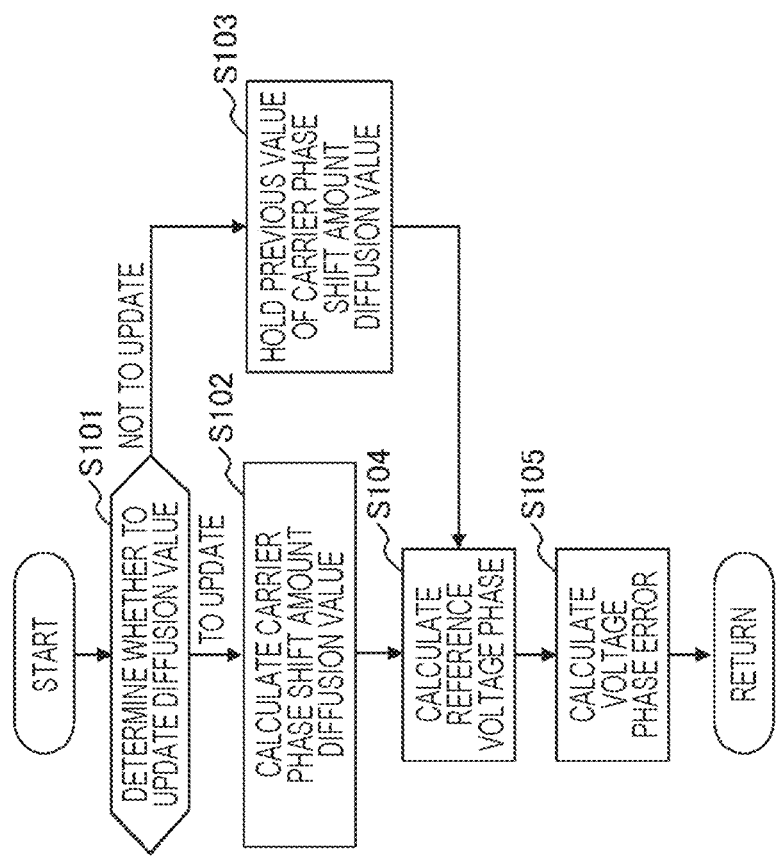
FIG. 12 is a flowchart illustrating calculation processing of the voltage phase error calculation unit according to the first embodiment of the present invention.

FIG. 12 is a flowchart illustrating calculation processing of the voltage phase error calculation unit 163 according to the first embodiment of the present invention.

In Step S101, the diffusion value update determination unit 1631 determines whether to update the diffusion value Dc. In a case where it is determined that the update is performed, the update signal Du is output and the process proceeds to Step S102, and in a case where it is determined that the update is not performed, the process proceeds to Step S103.

In Step S102, the carrier phase shift amount diffusion value calculation unit 1632 calculates the diffusion value Dc and updates the diffusion value Dc. At this time, the carrier phase shift amount diffusion value calculation unit 1632 selects a random number generated by the random number generator 16321 by the switching unit 16323 according to the update signal Du, and outputs the random number as the diffusion value Dc. Thereafter, the process proceeds to Step S104.

In Step S103, the carrier phase shift amount diffusion value calculation unit 1632 holds the previous diffusion value Dc. At this time, the carrier phase shift amount diffusion value calculation unit 1632 selects the previous diffusion value Dc held by the previous value holding unit 16322 by the switching unit 16323 and outputs the selected value as the diffusion value Dc. Thereafter, the process proceeds to Step S104.

In Step S104, the reference voltage phase calculation unit 1633 calculates a reference voltage phase θvb.

In Step S105, the addition unit 1634 and the subtraction unit 1635 calculate the voltage phase error Δθv using the diffusion value Dc obtained by the carrier phase shift amount diffusion value calculation unit 1632 in Step S102 or S103 and the reference voltage phase θvb obtained by the reference voltage phase calculation unit 1633 in Step S104.

The voltage phase error calculation unit 163 calculates the voltage phase error Δθv as described above. As a result, the voltage phase error Δθv can be determined such that the phase difference between the triangular wave signal Tr and the three-phase voltage commands Vu*, Vv*, and Vw* is randomly changed while the synchronous PWM control of synchronizing the triangular wave signal Tr with the three-phase voltage commands Vu*, Vv*, and Vw* is maintained. As a result, the carrier wave frequency fc can be set so as to suppress the peak of the harmonic current generated in the motor 2, thereby reducing the torque pulsation and the electromagnetic excitation force.

Figure 13:
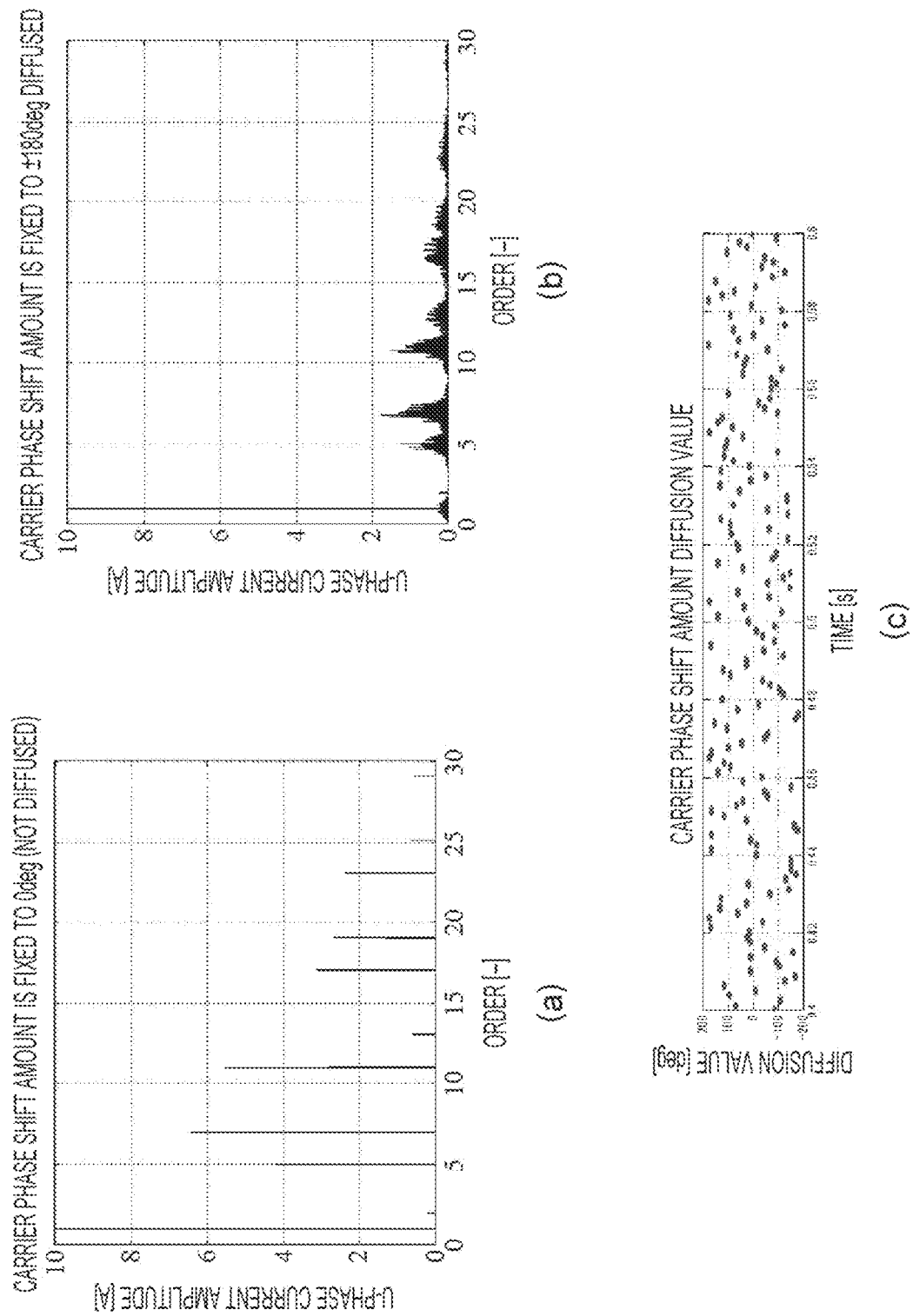
FIG. 13 is a diagram illustrating an example of a state of change in each harmonic and diffusion value of a U-phase current depending on whether the motor control method of the present embodiment is applied.
Figure 14:
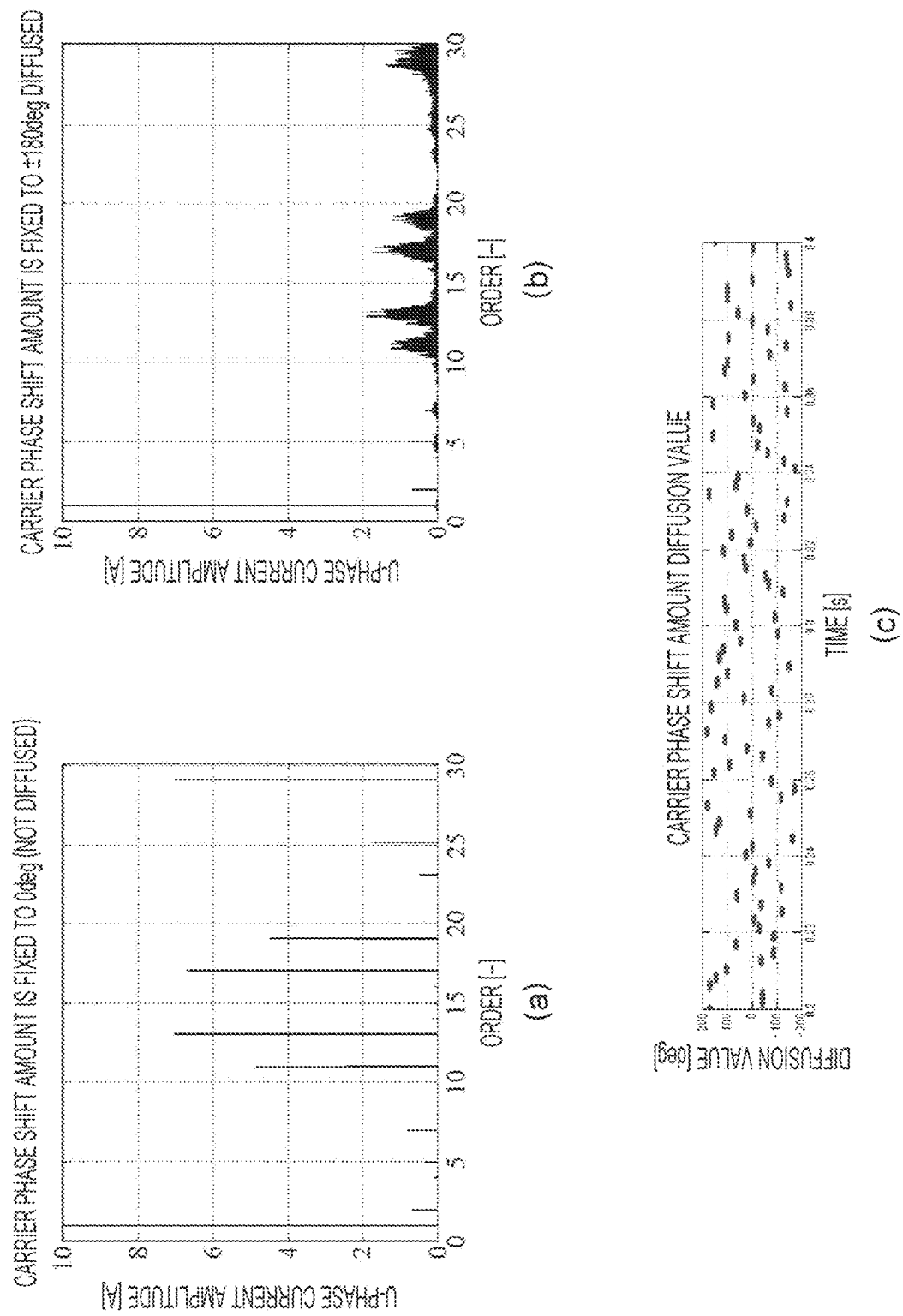
FIG. 14 is a diagram illustrating an example of a state of change in each harmonic and diffusion value of the U-phase current depending on whether the motor control method of the present embodiment is applied.

The effect of reducing the vibration and noise of the motor 2 by the motor control device 1 of the present embodiment will be described below with reference to FIGS. 13 and 14. FIG. 13 illustrates an example of how the harmonics of the U-phase current and the diffusion value Dc change depending on whether the motor control method of the present embodiment is applied when Nc=9. FIG. 14 illustrates an example of how the harmonics of the U-phase current and the diffusion value Dc change depending on whether the motor control method of the present embodiment is applied when Nc=15. FIGS. 13(a) and 14(a) illustrate examples of the magnitude of each order component of each harmonic of the U-phase current in a case where the diffusion value Dc of the triangular wave signal Tr with respect to the U-phase voltage command Vu* is fixed to 0, that is, when the motor control method of the present embodiment is not applied. Meanwhile, FIGS. 13(b) and 14(b) illustrate examples of the magnitude of each order component of each harmonic of the U-phase current in a case where the motor control method of the present embodiment is applied and the diffusion range of the diffusion value Dc of the triangular wave signal Tr with respect to the U-phase voltage command Vu* is set to ±180 deg. In addition, FIGS. 13(c) and 14(c) illustrate how the diffusion value Dc changes with time when the diffusion range of the diffusion value Dc is set to ±180 deg.

In either case of FIGS. 13 and 14, it can be confirmed that each harmonic included in the U-phase current is diffused by applying the motor control method of the present embodiment, thereby reducing the peak of the harmonic current. Therefore, it can be seen that the effect of reducing the vibration and noise of the motor 2 can be obtained.

Although FIGS. 13 and 14 illustrate only the case of Nc=9 and the case of Nc=15 for convenience of description, the present invention is not limited thereto, and can be applied to any synchronous PWM carrier wave number Nc. FIGS. 13 and 14 illustrate examples in which the diffusion value Dc of the triangular wave signal Tr corresponding to the U-phase voltage command Vu* is fixed to 0 and in which the triangular wave signal Tr is diffused in the diffusion range of ±180 deg. However, similarly, the diffusion value Dc of the triangular wave signal Tr corresponding to the voltage command of another phase, that is, the V-phase voltage command Vv* and the W-phase voltage command Vw* is diffused in the predetermined diffusion range, so that it is possible to reduce the peak of the harmonic current of each phase and obtain the effect of reducing the vibration and noise of the motor 2. Furthermore, the diffusion range of the diffusion value Dc is not limited to ±180 deg, and by setting an arbitrary diffusion range, it is possible to reduce the peak of the harmonic current and obtain the effect of reducing the vibration and noise of the motor 2.

According to the embodiment described above, it is possible to realize the vibration and noise of the motor 2 caused by the time harmonic appearing as the number of switching pulses decreases while avoiding the deterioration of the switching loss of the inverter 3. Therefore, it is possible to contribute to reduction in vibration and noise of the motor drive system. As a result, in the present embodiment, it is possible to reduce members for vibration/noise countermeasures such as a damping material and a sound absorbing material, which are necessary in the conventional motor drive system, and thus, it is possible to contribute to cost reduction and weight reduction.

According to the first embodiment of the present invention described above, the following operational effects are achieved.

(1) The motor control device 1 is connected to the inverter 3 that performs the power conversion from DC power to AC power, and controls driving of the motor 2 driven using the AC power. The motor control device 1 includes the triangular wave generation unit 17 that generates the triangular wave signal Tr that is a carrier wave, the carrier wave frequency adjustment unit 16 that adjusts the carrier wave frequency fc representing the frequency of the triangular wave signal Tr, and the gate signal generation unit 18 that performs pulse width modulation of three-phase voltage commands Vu*, Vv*, and Vw* according to the torque command T* using the triangular wave signal Tr and generates the gate signal for controlling the operation of the inverter 3. The motor control device 1 randomly changes the phase difference between the three-phase voltage commands Vu*, Vv*, and Vw* and the triangular wave signal Tr. With this configuration, the peak of the harmonic current in the AC current flowing through the motor 2 can be reduced. As a result, vibration and noise generated in the motor 2 can be effectively suppressed.

(2) The carrier wave frequency adjustment unit 16 adjusts the carrier wave frequency fc so as to randomly change the phase difference between the three-phase voltage commands Vu*, Vv*, and Vw* and the triangular wave signal Tr. Specifically, the voltage phase error calculation unit 163 calculates the diffusion value Dc that randomly changes within a predetermined diffusion range, and adjusts the carrier wave frequency fc based on the diffusion value Dc. With this configuration, it is possible to reliably and easily realize the random change in the phase difference between the three-phase voltage commands Vu*, Vv*, and Vw* and the triangular wave signal Tr while maintaining the synchronous PWM control.

(3) The voltage phase error calculation unit 163 of the carrier wave frequency adjustment unit 16 includes the diffusion value update determination unit 1631 that determines whether to update the diffusion value Dc based on the voltage phase θv representing the phases of the three-phase voltage commands Vu*, Vv*, and Vw*, and the carrier phase shift amount diffusion value calculation unit 1632 that calculates the diffusion value Dc. Then, the voltage phase error calculation unit 163 holds the previous calculation result of the diffusion value Dc by the carrier phase shift amount diffusion value calculation unit 1632 when the diffusion value update determination unit 1631 determines not to update the diffusion value Dc, and updates the diffusion value Dc using the current calculation result of the diffusion value Dc by the carrier phase shift amount diffusion value calculation unit 1632 when the diffusion value update determination unit 1631 determines to update the diffusion value Dc. With this configuration, the diffusion value Dc can be updated at an appropriate timing, and the phase difference between the three-phase voltage commands Vu*, Vv*, and Vw* and the triangular wave signal Tr can be randomly changed.

(4) The diffusion value update determination unit 1631 determines whether the synchronous PWM control for synchronizing the triangular wave signal Tr with the three-phase voltage commands Vu*, Vv*, and Vw* has converged based on the voltage phase θv, and determines to update the diffusion value Dc when determining that the synchronous PWM control is converged. Specifically, the diffusion value update determination unit 1631 determines that the synchronous PWM control has converged when the change amount of the voltage phase θv exceeds a predetermined specified phase or when the voltage phase error Δθv representing the phase difference between the three-phase voltage commands Vu*, Vv*, and Vw* and the triangular wave signal Tr is converged within a predetermined range. With this configuration, the diffusion value Dc can be updated at an appropriate timing.

(5) The motor control device 1 randomly changes the phase difference between the three-phase voltage commands Vu*, Vv*, and Vw* and the triangular wave signal Tr within a predetermined range whose upper limit is the range from −180 deg to +180 deg. With this configuration, the peak of the harmonic current in the AC current flowing through the motor 2 can be reduced in an arbitrary range or size.

Second Embodiment

Next, a second embodiment of the present invention will be described with reference to the drawings.

Figure 15:
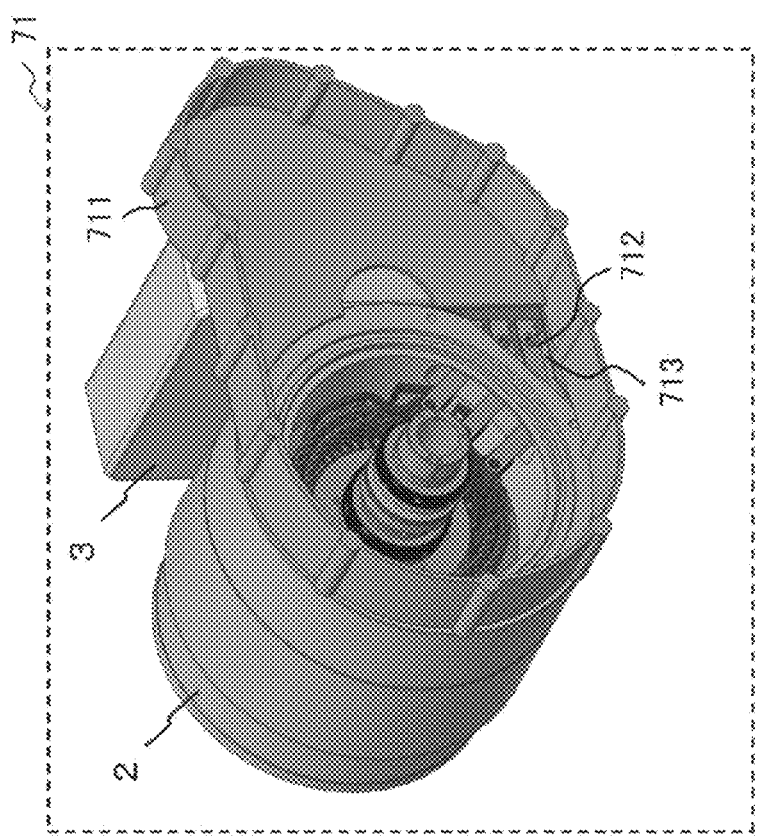
FIG. 15 is an external perspective view of an electromechanical integrated unit according to a second embodiment of the present invention.

FIG. 15 is an external perspective view of an electro-mechanical integrated unit 71 according to the second embodiment.

The electro-mechanical integrated unit 71 includes the motor drive system 100 (motor control device 1, motor 2, and inverter 3) described in the first embodiment. The motor 2 and the inverter 3 are connected by a coupling portion 713 via a bus bar 712. The output of the motor 2 is transmitted to a differential gear (not illustrated) via a gear 711 and is transmitted to an axle. Although the motor control device 1 is not illustrated in FIG. 15, the motor control device 1 can be disposed at an arbitrary position.

The electro-mechanical integrated unit 71 is characterized by a structure in which the motor 2, the inverter 3, and the gear 711 are integrated. In the electro-mechanical integrated unit 71, due to such an integrated structure, resonance may occur when vibration/noise caused by the time harmonic generated in the motor 2 swings the inverter 3 or the gear 711, and in this case, the vibration/noise deteriorates. However, by controlling the drive of the motor 2 using the motor control device 1 described in the first embodiment, the frequency at which vibration and noise are generated in the motor 2 can be diffused and the peak value thereof can be reduced, so that it is possible to realize the electro-mechanical integrated unit with low vibration and low noise.

Third Embodiment

Next, a third embodiment of the present invention will be described with reference to the drawings.

Figure 16:
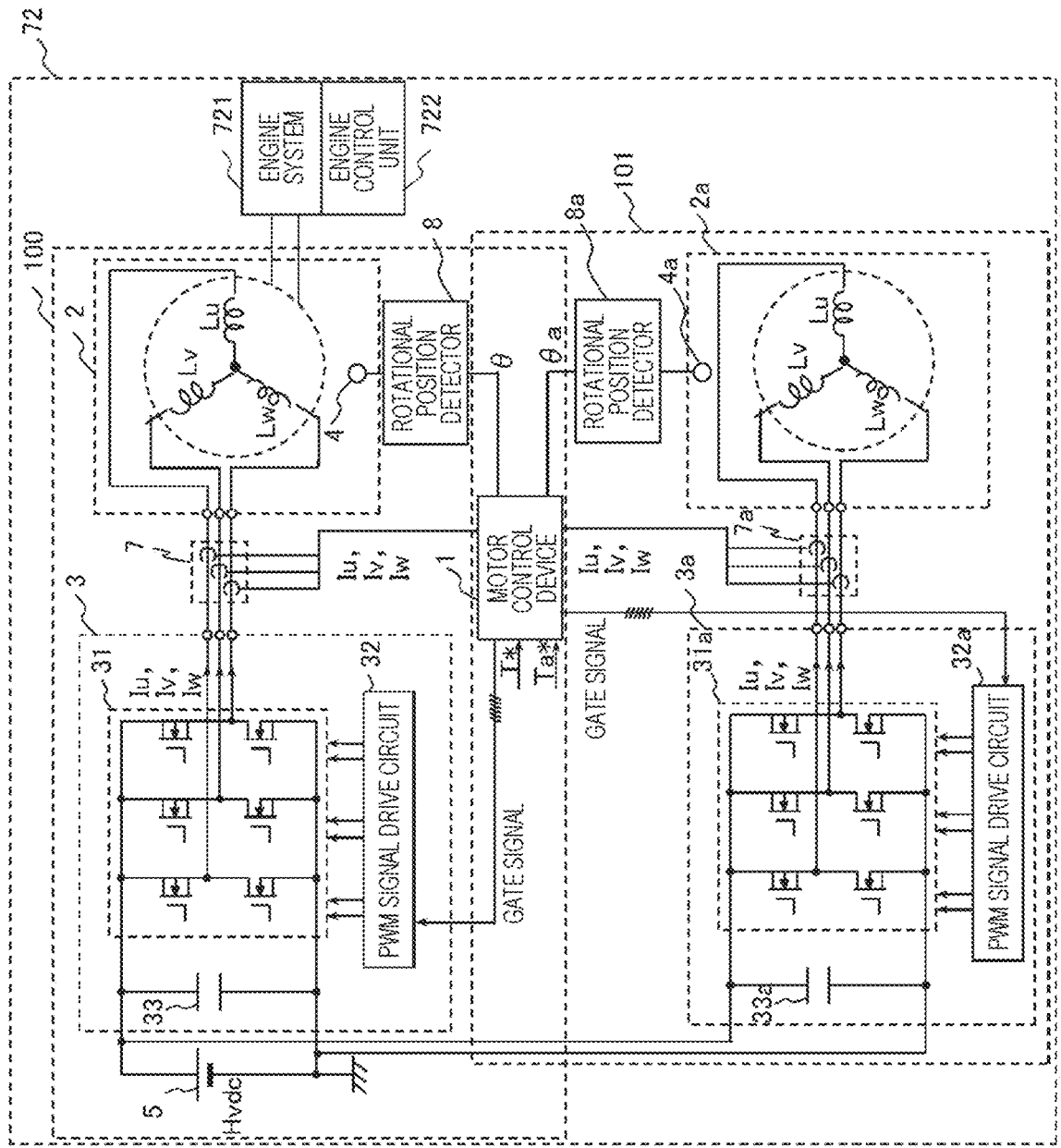
FIG. 16 is a configuration diagram of a hybrid system according to a third embodiment of the present invention.

FIG. 16 is a configuration diagram of a hybrid system 72 according to the third embodiment.

As illustrated in FIG. 16, the hybrid system 72 includes the motor drive system 100 (motor control device 1, motor 2, inverter 3, high-voltage battery 5, current detection unit 7, rotational position detector 8) described in the first embodiment and a motor drive system 101 (motor control device 1, motor 2a, inverter 3a, high-voltage battery 5, current detection unit 7a, rotational position detector 8a) similar thereto. The motor drive systems 100 and 101 share the motor control device 1 and the high-voltage battery 5.

A rotational position sensor 4a for detecting a rotational position ea of a rotor is attached to the motor 2a. The rotational position detector 8a calculates the rotational position ea from an input signal of the rotational position sensor 4a, and outputs the rotational position θa to the motor control device 1. The current detection unit 7a is disposed between the inverter 3a and the motor 2a.

The inverter 3a includes an inverter circuit 31a, a PWM signal drive circuit 32a, and a smoothing capacitor 33a. The PWM signal drive circuit 32a is connected to the motor control device 1 common to the PWM signal drive circuit 32 of the inverter 3, generates a PWM signal for controlling each switching element of the inverter circuit 31a on the basis of a gate signal input from the motor control device 1, and outputs the PWM signal to the inverter circuit 31a. The inverter circuit 31a and the smoothing capacitor 33a are connected to the high-voltage battery 5 common to the inverter circuit 31 and the smoothing capacitor 33.

A torque command T* for the motor 2 and a torque command Ta* for the motor 2a are input to the motor control device 1. Based on these torque commands, the motor control device 1 generates gate signals for controlling the drive of the motors 2 and 2a by the method described in the first embodiment, and outputs the gate signals to the inverters 3 and 3a, respectively. That is, the voltage phase error calculation unit 163 of the carrier wave frequency adjustment unit 16 included in the motor control device 1 calculates the voltage phase error Δθv to adjust the frequency of the triangular wave signal Tr, which is the carrier wave, so that vibration and noise generated in the motors 2 and 2a can be suppressed. In the voltage phase error calculation unit 163, the carrier phase shift amount diffusion value calculation unit 1632 may set different diffusion values Dc for the inverters 3 and 3a.

An engine system 721 and an engine control unit 722 are connected to the motor 2. The engine system 721 is driven under the control of the engine control unit 722 to rotationally drive the motor 2. The motor 2 is rotationally driven by the engine system 721 to operate as a generator and generate AC power. The AC power generated by the motor 2 is converted into DC power by the inverter 3 and charged in the high-voltage battery 5. As a result, the hybrid system 72 can function as a series hybrid system. The engine system 721 and the engine control unit 722 may be connectable to the motor 2a.

According to the present embodiment, the hybrid system 72 of FIG. 16 is realized by using the motor control device 1 described in the first embodiment, so that it is possible to obtain an effect of reducing the vibration and noise of the motors 2 and 2a caused by the time harmonic. Therefore, it is possible to reduce a damping material, a sound absorbing material, and the like which are necessary for vibration/noise countermeasures in the conventional hybrid system.

Fourth Embodiment

Next, a fourth embodiment of the present invention will be described with reference to the drawings. In the present embodiment, an application example to an electric power steering system will be described.

Figure 17:
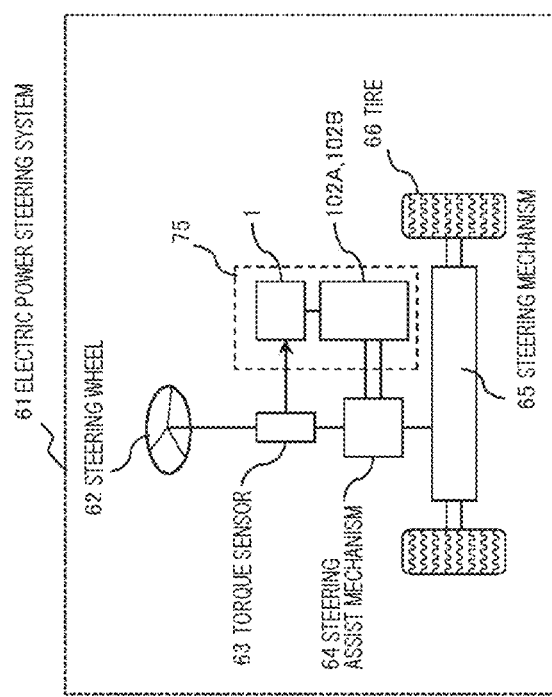
FIG. 17 is a configuration diagram of an electric power steering system according to a fourth embodiment of the present invention.

FIG. 17 is a diagram illustrating a configuration of an electric power steering system according to a fourth embodiment of the present invention. An electric power steering system 61 includes a drive control system 75 including the motor control device 1 described in the first embodiment and redundant drive systems 102A and 102B. The electric power steering system 61 detects the rotational torque of a steering wheel 62 by a torque sensor 63 and operates the drive control system 75 based on the rotational torque. As a result, an assist torque according to the input of the steering wheel 62 is generated using the rotational driving force of the motor 2 included in the drive control system 75, and is output to a steering mechanism 65 via a steering assist mechanism 64, thereby assisting the steering operation of the driver. As a result, a tire 66 is steered by the steering mechanism 65, and a traveling direction of the vehicle is controlled.

In general, since an electric power steering system of a vehicle is directly connected to a driver via a steering wheel, vibration and noise are easily transmitted to the driver, and required specifications for vibration and noise are high. In particular, in a state where the driver rotates the steering wheel at a high speed, the operation of the motor becomes dominant as a cause of vibration and noise as compared with other generation factors. On the other hand, the electric power steering system 61 of the present embodiment can effectively reduce the vibration in a state where the driver rotates the steering wheel 62 at a high speed, and thus, can realize an electric power steering system with low vibration and low noise.

Figure 18:
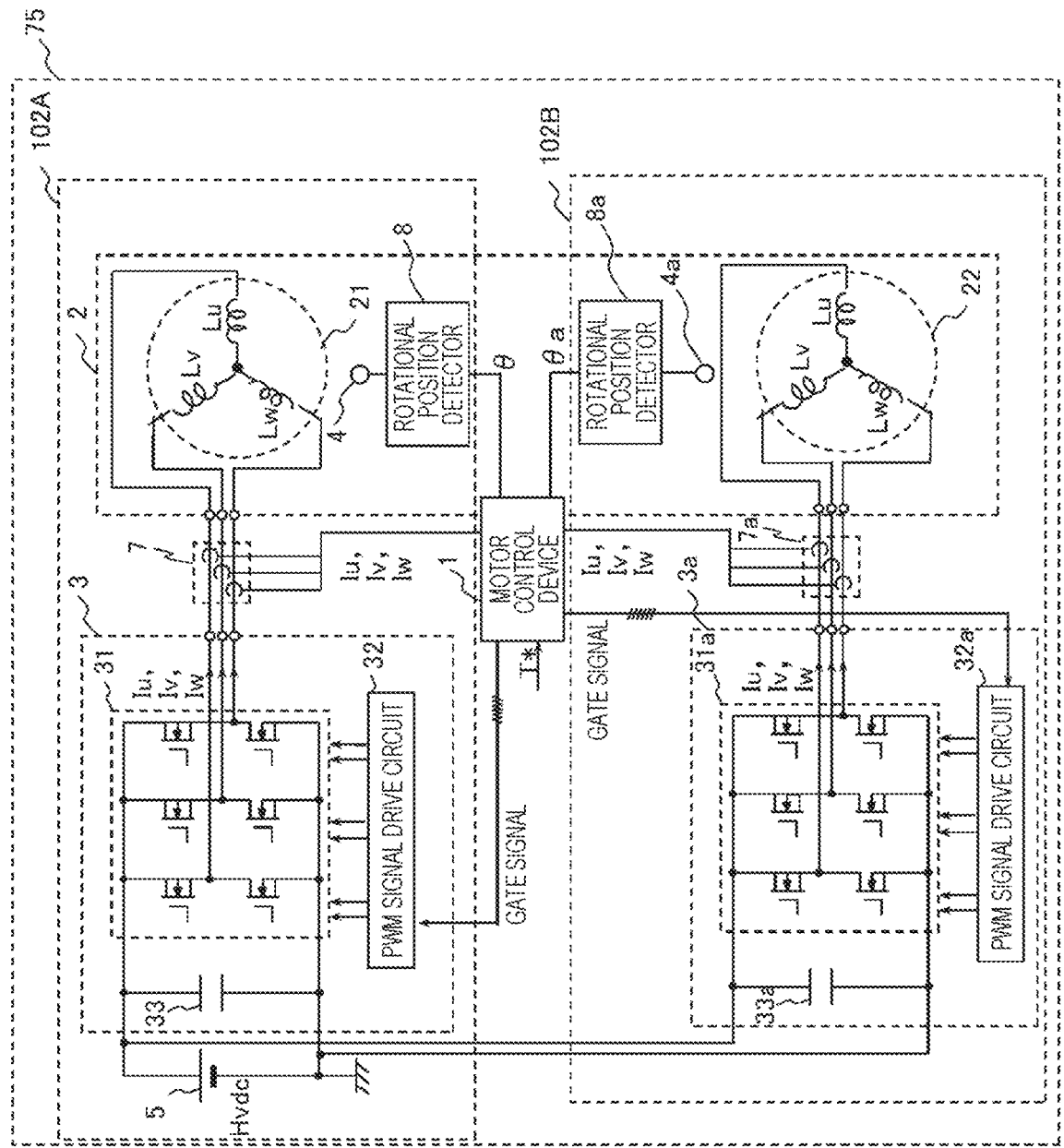
FIG. 18 is a configuration diagram of a drive control system in the electric power steering system according to a fourth embodiment of the present invention.

FIG. 18 is a diagram illustrating a configuration of a drive control system 75 in the electric power steering system 61 according to the fourth embodiment of the present invention. In the drive control system 75, the motor control device 1, the motor 2, and the high-voltage battery 5 are commonly connected to the redundant drive systems 102A and 102B. In the present embodiment, the motor 2 includes two winding systems 21 and 22, one winding system 21 constitutes the drive system 102A, and the other winding system 22 constitutes the drive system 102B.

The drive system 102A includes the inverter 3 and the rotational position detector 8, and the rotational position sensor 4 for detecting a rotational position θ of a rotor corresponding to the winding system 21 is attached to the motor 2. The AC power generated by the inverter 3 flows to the winding system 21 of the motor 2 to rotationally drive the motor 2. In the drive system 102A, the current detection unit 7 is disposed between the inverter 3 and the motor 2.

The drive system 102B includes the inverter 3a and the rotational position detector 8a, and the rotational position sensor 4a for detecting the rotational position θa of a rotor corresponding to the winding system 22 is attached to the motor 2. The AC power generated by the inverter 3a flows to the winding system 22 of the motor 2 to rotationally drive the motor 2. In the drive system 102B, the current detection unit 7a is disposed between the inverter 3a and the motor 2. Note that the inverter 3a, the rotational position detector 8a, the rotational position sensor 4a, and the current detection unit 7a are similar to those in FIG. 16 described in the third embodiment.

A torque command T* for the motor 2 is input to the motor control device 1. The motor control device 1 generates a gate signal for controlling driving of the motor 2 by the method described in the first embodiment on the basis of the input torque command T*, and outputs the gate signal to each of the inverters 3 and 3a. That is, the voltage phase error calculation unit 163 of the carrier wave frequency adjustment unit 16 included in the motor control device 1 calculates the voltage phase error Δθv to adjust the frequency of the triangular wave signal Tr, which is the carrier wave, so that vibration and noise generated in the drive systems 102A and 102B can be suppressed. In the voltage phase error calculation unit 163, the carrier phase shift amount diffusion value calculation unit 1632 may set different diffusion values Dc for the inverters 3 and 3a.

According to the present embodiment, the electric power steering system 61 of FIG. 17 is realized by using the motor control device 1 described in the first embodiment, so that the effect of reducing the vibration and noise of the motor 2 caused by the time harmonic can be obtained. Therefore, an electric power steering system with low vibration and low noise can be realized.

In each of the embodiments described above, each configuration (FIGS. 2, 7, 8, 9, and the like) in the motor control device 1 may implement the function of each configuration by a CPU and a program regardless of the configuration by hardware. In a case where each configuration in the motor control device 1 is realized by the CPU and the program, there is an advantage that the cost can be reduced because the number of pieces of hardware is reduced. In addition, this program can be provided by being stored in advance in a storage medium of the motor control device. Alternatively, the program may be stored and provided in an independent storage medium, or the program may be recorded and stored in a storage medium of the motor control device via a network line. Various forms of computer-readable computer program products, such as data signals (carrier waves), may be provided.

The present invention is not limited to the above embodiments, and other forms conceivable within the scope of the technical idea of the present invention are also included within the scope of the present invention as long as the features of the present invention are not impaired. In addition, a configuration in which the plurality of embodiments described above are combined may be adopted.

REFERENCE SIGNS LIST 1 motor control device
2 motor
3 inverter
4 rotational position sensor
5 high-voltage battery
7 current detection unit
8 rotational position detector
11 current command generation unit
12 speed calculation unit
13 three-phase/dq conversion unit
14 current control unit
15 dq/three-phase voltage conversion unit
16 carrier wave frequency adjustment unit
17 triangular wave generation unit
18 gate signal generation unit
31 inverter circuit
32 PWM signal drive circuit
33 smoothing capacitor
61 electric power steering system
71 electro-mechanical integrated unit
72 hybrid system
75 drive control system
100, 101 motor drive system
102A, 102B drive system
161 synchronous PWM carrier waver number selection unit
162 voltage phase calculation unit
163 voltage phase error calculation unit
164 synchronous carrier wave frequency calculation unit
165 carrier wave frequency setting unit
1631 diffusion value update determination unit
1632 carrier phase shift amount diffusion value calculation unit
1633 reference voltage phase calculation unit
1634 addition unit
1635 subtraction unit
16321 random number generator
16322 previous value holding unit
16323 switching unit

The invention claimed is:

1. A motor control device that is connected to a power converter that performs power conversion from DC power to AC power and controls driving of an AC motor driven using the AC power, the motor control device comprising:
a carrier wave generation unit that generates a carrier wave;
a carrier wave frequency adjustment unit that adjusts a frequency of the carrier wave; and
a gate signal generation unit that performs pulse width modulation on a voltage command according to a torque command using the carrier wave and generates a gate signal for controlling an operation of the power converter,
wherein a phase difference between the voltage command and the carrier wave is randomly changed.

2. The motor control device according to claim 1, wherein the carrier wave frequency adjustment unit adjusts the frequency of the carrier wave so as to randomly change the phase difference between the voltage command and the carrier wave.

3. The motor control device according to claim 2, wherein the carrier wave frequency adjustment unit calculates a diffusion value that randomly changes within a predetermined diffusion range, and adjusts the frequency of the carrier wave based on the diffusion value.

4. The motor control device according to claim 3, wherein the carrier wave frequency adjustment unit includes a diffusion value update determination unit that determines whether to update the diffusion value based on a phase of the voltage command, and a diffusion value calculation unit that calculates the diffusion value, and holds a previous calculation result of the diffusion value from the diffusion value calculation unit when the diffusion value update determination unit determines not to update the diffusion value, and updates the diffusion value using a current calculation result of the diffusion value from the diffusion value calculation unit when the diffusion value update determination unit determines to update the diffusion value.

5. The motor control device according to claim 4, wherein the diffusion value update determination unit determines, based on the phase of the voltage command, whether synchronous PWM control for synchronizing the carrier wave with the voltage command has converged, and determines to update the diffusion value when determining that the synchronous PWM control has converged.

6. The motor control device according to claim 5, wherein the diffusion value update determination unit determines that the synchronous PWM control has converged when a change amount of the phase of the voltage command exceeds a predetermined specified phase or when the phase difference between the voltage command and the carrier wave converges within a predetermined range.

7. The motor control device according to claim 1, wherein the phase difference between the voltage command and the carrier wave is randomly changed within a predetermined range whose upper limit is a range from −180 deg to +180 deg.

8. An electro-mechanical integrated unit comprising:
the motor control device according to claim 1;
the power converter connected to the motor control device;
the AC motor driven by the power converter; and
a gear that transmits a rotational driving force of the AC motor,
wherein the AC motor, the power converter, and the gear are integrated.

9. A hybrid system comprising:
the motor control device according to claim 1;
the power converter connected to the motor control device;
the AC motor driven by the power converter; and
an engine system connected to the AC motor.

10. An electric power steering system comprising:
the motor control device according to claim 1;
the power converter connected to the motor control device; and
the AC motor driven by the power converter,
wherein a steering operation of a driver is assisted using a rotational driving force of the AC motor.

* * * * *